US009576686B2

(12) United States Patent
Fortino

(10) Patent No.: US 9,576,686 B2
(45) Date of Patent: Feb. 21, 2017

(54) REACTOR COOLANT PUMP SYSTEM INCLUDING TURBO PUMPS SUPPLIED BY A MANIFOLD PLENUM CHAMBER

(71) Applicant: Babcock & Wilcox Power Generation Group, Inc., Barberton, OH (US)

(72) Inventor: Robert T Fortino, Canton, OH (US)

(73) Assignee: BWXT Foreign Holdings, LLC, Charlotte, NC (US)

( * ) Notice: Subject to any disclaimer, the term of this patent is extended or adjusted under 35 U.S.C. 154(b) by 876 days.

(21) Appl. No.: 13/863,047

(22) Filed: Apr. 15, 2013

(65) Prior Publication Data

US 2013/0301788 A1 Nov. 14, 2013

Related U.S. Application Data

(60) Provisional application No. 61/624,693, filed on Apr. 16, 2012, provisional application No. 61/624,966, filed on Apr. 16, 2012.

(51) Int. Cl.
*G21C 15/25* (2006.01)
*F04D 7/08* (2006.01)
(Continued)

(52) U.S. Cl.
CPC ............... *G21C 15/25* (2013.01); *F04D 7/08* (2013.01); *F04D 13/04* (2013.01); *G21C 1/322* (2013.01);
(Continued)

(58) Field of Classification Search
CPC ....... G21C 15/25; G21C 15/243; G21C 1/322; G21C 1/328
(Continued)

(56) References Cited

U.S. PATENT DOCUMENTS 2,496,496 A * 2/1950 Roth .................. F04D 5/00
415/227
3,312,595 A * 4/1967 Hackney ............. G21C 1/322
376/406

(Continued)

OTHER PUBLICATIONS

Mazzi (Mazzi, Ruben, CAREM: An Innovative-Integrated PWR, 18th International Conferences on Structural Mechanics in Reactor Technology, Aug. 2005, pp. 4407-4415).
(Continued)

*Primary Examiner* — Jack W Keith
*Assistant Examiner* — Daniel Wasil
(74) *Attorney, Agent, or Firm* — Nelson Mullins Riley & Scarborough, LLP

(57) ABSTRACT

A nuclear reactor includes a nuclear core comprising a fissile material, and a pressure vessel containing the nuclear core immersed in primary coolant water. Turbo pumps disposed in the pressure vessel provide active circulation of primary coolant water in the pressure vessel. Each turbo pump includes a turbine driving an impeller. A manifold plenum chamber is disposed in the pressure vessel, and is in fluid communication with inlets of the turbines of the turbo pumps. An electrically driven pump operatively connected with the manifold plenum chamber to pressurize the manifold plenum chamber with primary coolant water. The turbo pumps may be disposed in openings passing through the manifold plenum chamber. The pressure vessel may be vertically oriented and cylindrical, with a cylindrical riser oriented coaxially inside, and the manifold plenum chamber may be annular and disposed in a downcomer annulus defined between the cylindrical riser and the cylindrical pressure vessel.

17 Claims, 23 Drawing Sheets

(51) Int. Cl.
*G21C 15/243* (2006.01)
*F04D 13/04* (2006.01)
G21C 1/32 (2006.01)
G21C 13/02 (2006.01)
G21C 13/028 (2006.01)

(52) U.S. Cl.
CPC ............ *G21C 15/243* (2013.01); *G21C 1/328* (2013.01); *G21C 13/02* (2013.01); *G21C 13/028* (2013.01); *Y02E 30/40* (2013.01)

(58) Field of Classification Search
USPC .................... 376/395, 402, 406, 407; 417/66
See application file for complete search history.

(56) References Cited

U.S. PATENT DOCUMENTS

| | | | | |
|---|---|---|---|---|
| 3,325,374 | A | | 6/1967 | Margen |
| 3,389,055 | A | | 6/1968 | Hughes |
| 3,425,907 | A | * | 2/1969 | Bonsel ............... G21C 15/25 376/407 |
| 3,934,457 | A | | 1/1976 | Clark et al. |
| 4,039,377 | A | | 8/1977 | Andrieu et al. |
| 4,057,467 | A | * | 11/1977 | Kostrzewa ............ G21C 1/322 376/406 |
| 4,072,563 | A | | 2/1978 | McDonald et al. |
| 4,315,800 | A | | 2/1982 | Yoshimoto et al. |
| 4,696,792 | A | | 9/1987 | Hobson |
| 4,716,009 | A | * | 12/1987 | Thaulez ............... G21D 3/12 376/242 |
| 4,734,250 | A | | 3/1988 | Veronesi |
| 4,859,885 | A | | 8/1989 | Kliman et al. |
| 4,886,430 | A | | 12/1989 | Veronesi et al. |
| 4,905,757 | A | | 3/1990 | Boardman et al. |
| 5,053,190 | A | * | 10/1991 | Gardner ............... G21C 1/322 376/406 |
| 5,073,335 | A | * | 12/1991 | Townsend ............ G21C 15/243 376/406 |
| 5,082,620 | A | | 1/1992 | Fennern |
| 5,118,466 | A | | 6/1992 | Raymond et al. |
| 5,124,115 | A | * | 6/1992 | Dillmann ............. G21C 15/243 376/406 |
| 5,135,711 | A | | 8/1992 | Borchardt et al. |
| 5,165,305 | A | | 11/1992 | Veronesi |
| 5,295,171 | A | | 3/1994 | Aburomia et al. |
| 5,449,180 | A | | 9/1995 | Monjean et al. |
| 5,642,011 | A | | 6/1997 | Fanning et al. |
| 5,689,537 | A | * | 11/1997 | Hahn .................... G21C 15/25 376/260 |
| 6,259,760 | B1 | | 7/2001 | Carelli et al. |
| 6,328,541 | B1 | | 12/2001 | Veronesi et al. |
| 6,504,888 | B1 | | 1/2003 | Fife et al. |
| 6,813,328 | B2 | | 11/2004 | Kitch et al. |
| 7,154,982 | B2 | | 12/2006 | Gautier et al. |
| 8,590,419 | B2 | | 11/2013 | Finegan et al. |
| 2005/0018806 | A1 | * | 1/2005 | Gautier ................. G21C 1/322 376/406 |
| 2008/0031394 | A1 | * | 2/2008 | Tominaga ................ G21D 1/02 376/361 |
| 2009/0252276 | A1 | * | 10/2009 | Ishida .................... G21C 15/25 376/361 |
| 2010/0183113 | A1 | | 7/2010 | Ishida et al. |
| 2012/0294405 | A1 | * | 11/2012 | Shargots ............. G21C 15/243 376/361 |

OTHER PUBLICATIONS

Kostin (V.I. Kostin et al., VBER-300 Reactor System and Power-Generating Units for Regional Nuclear Power Production, Atomic Energy, vol. 102, No. 1 (2007).
Brogan, R.J., Shell and Tube Heat Exchangers, www.thermopedia.com/contentJ1121, Sep. 2014.
Status Report 66—VBER-300, Jan. 2011.

* cited by examiner

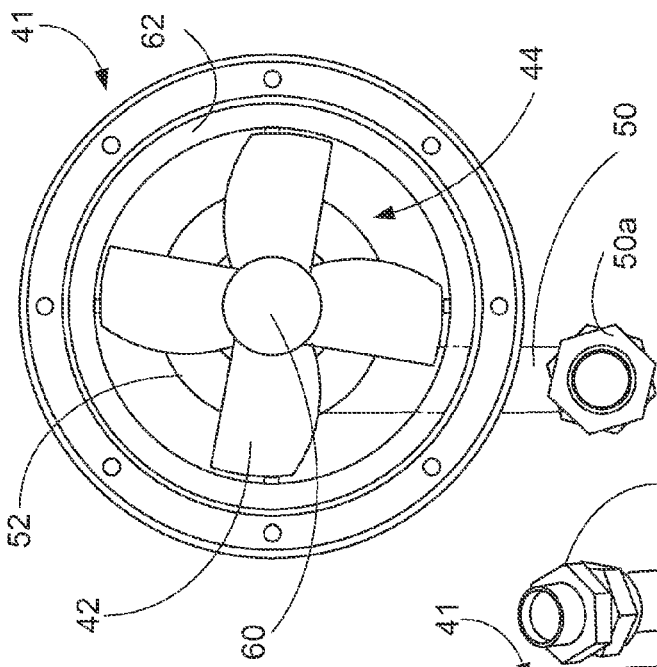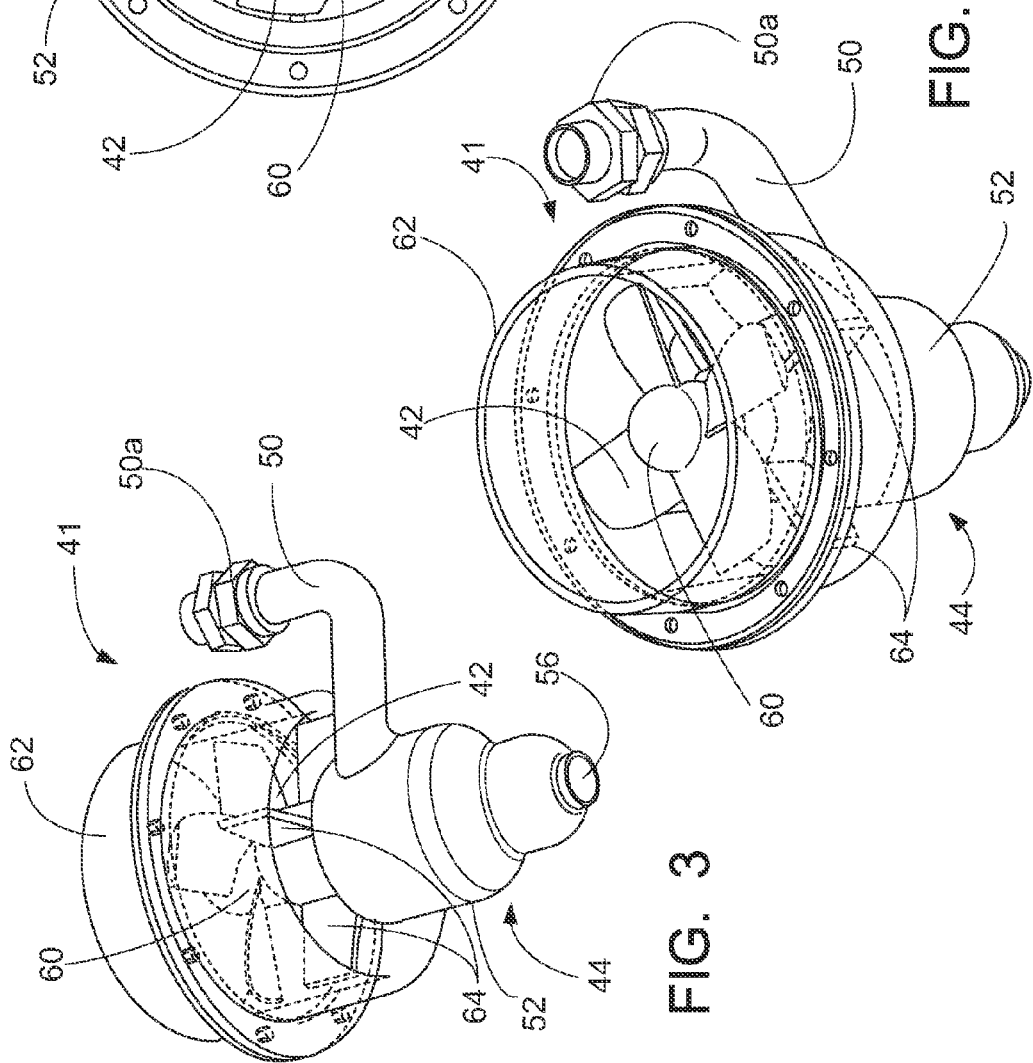

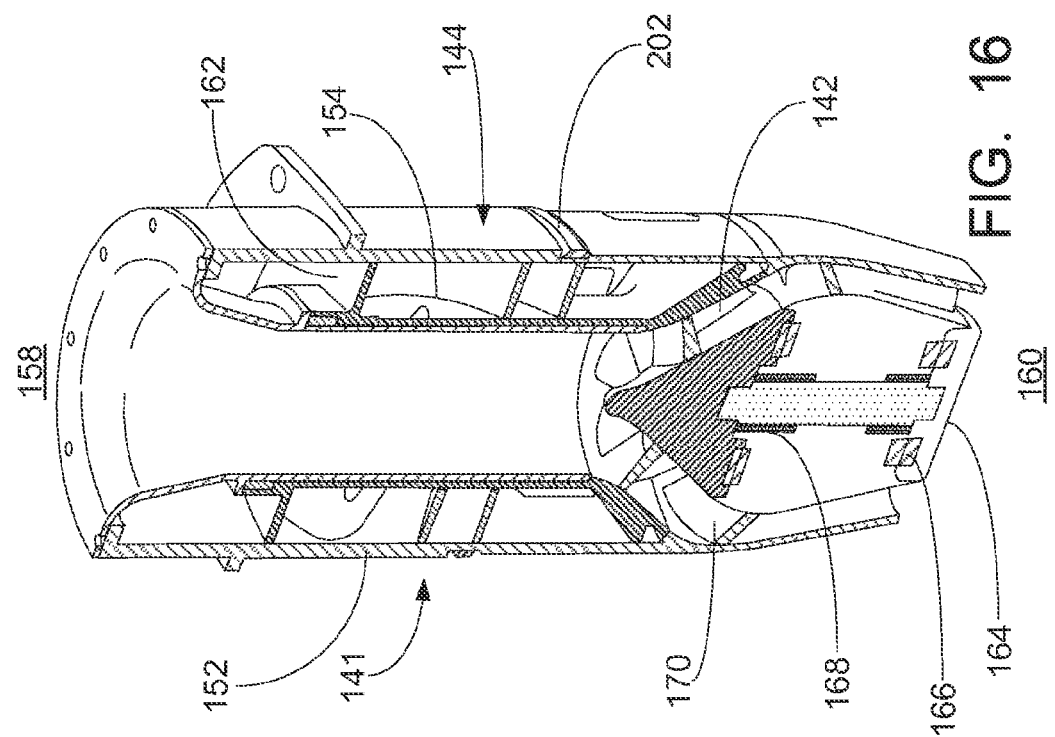
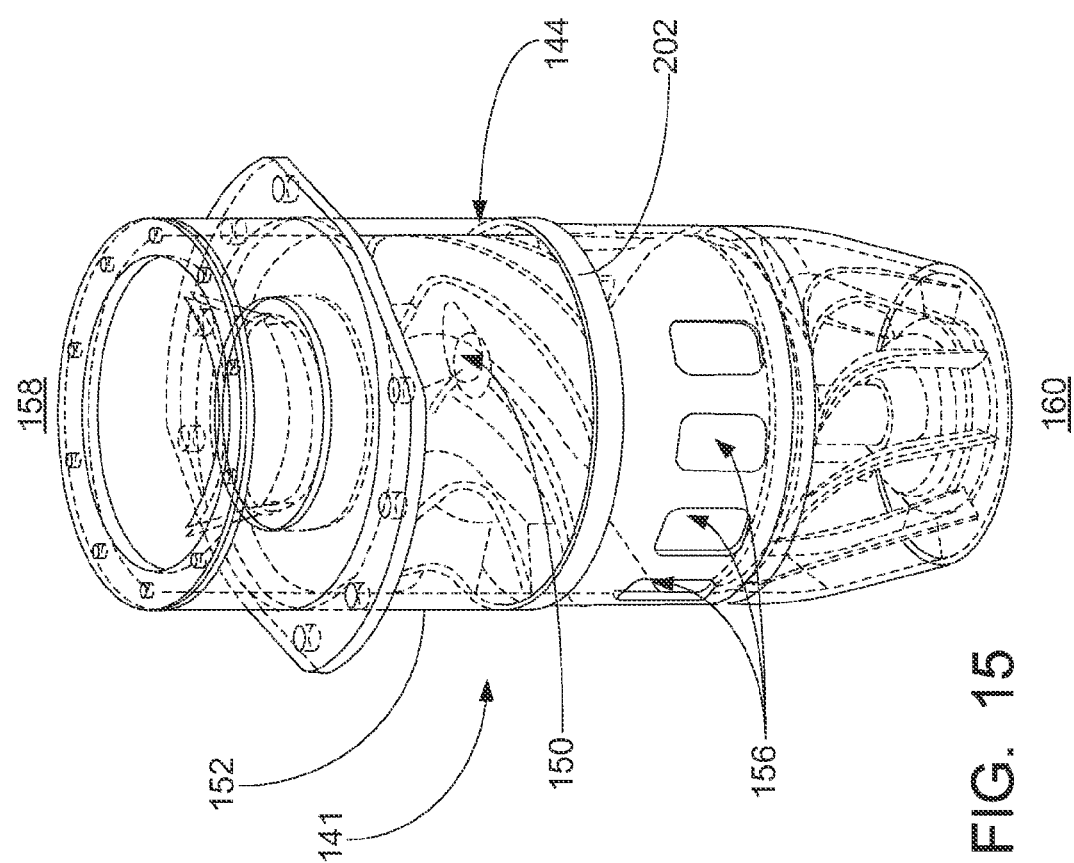

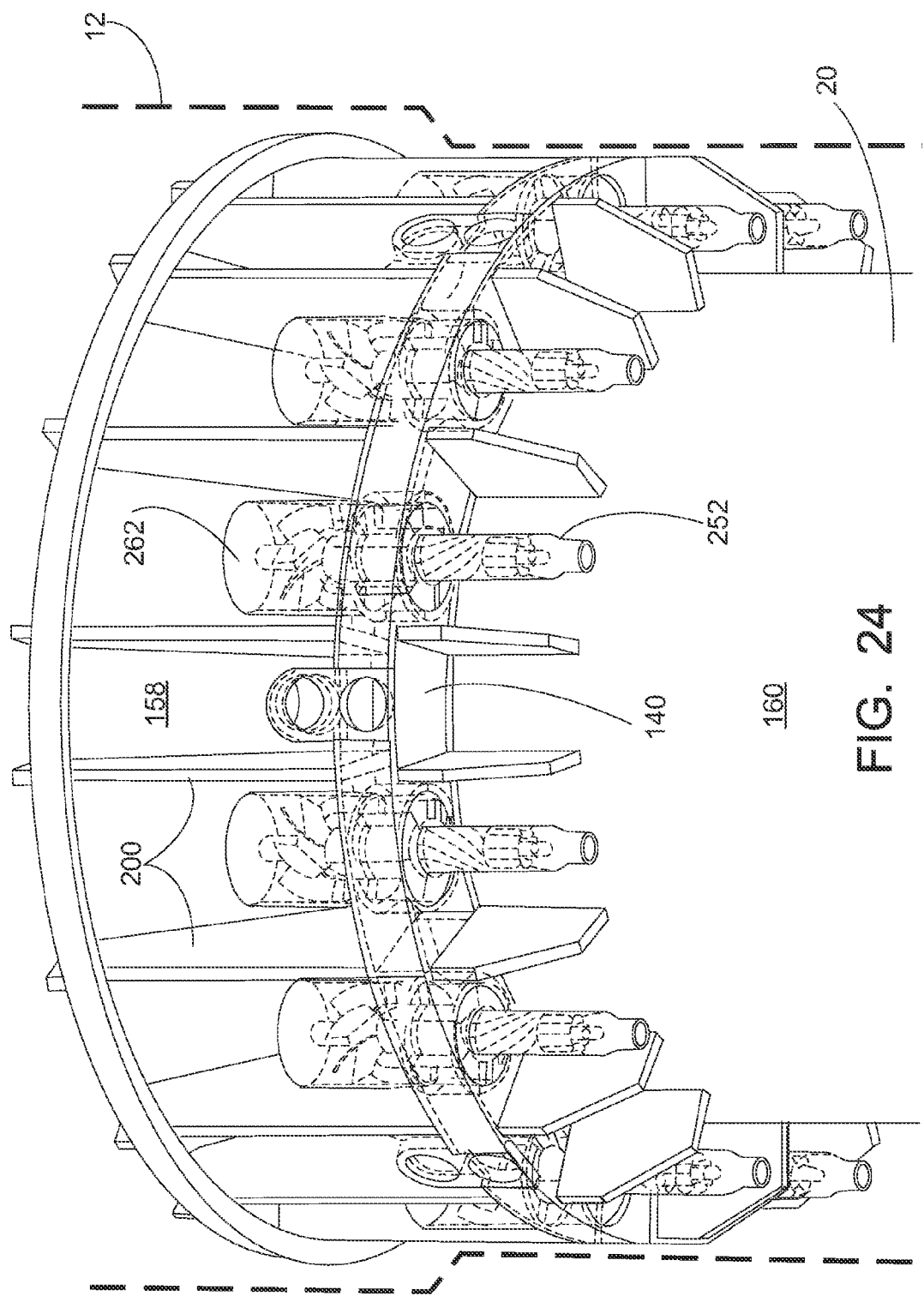

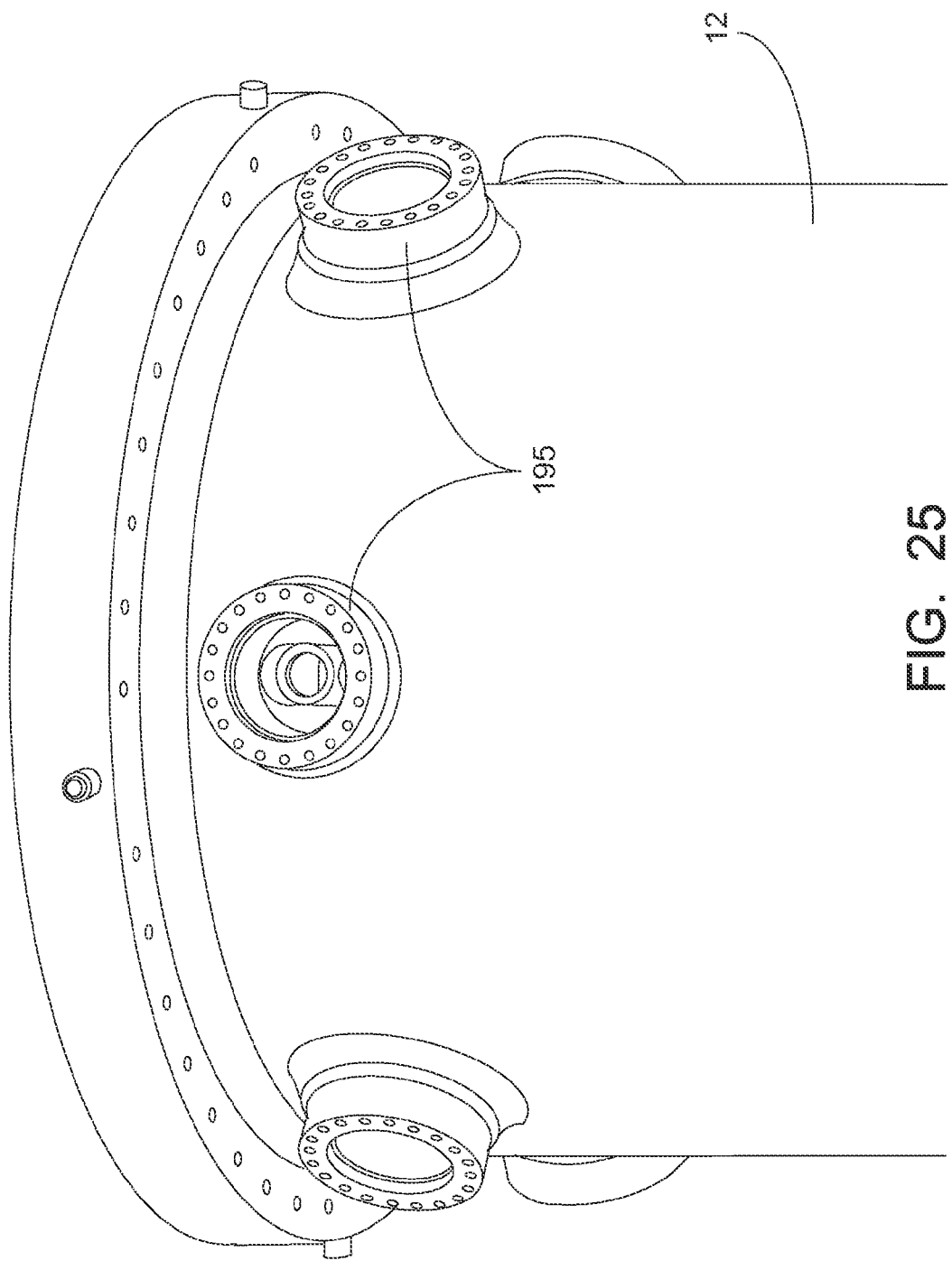

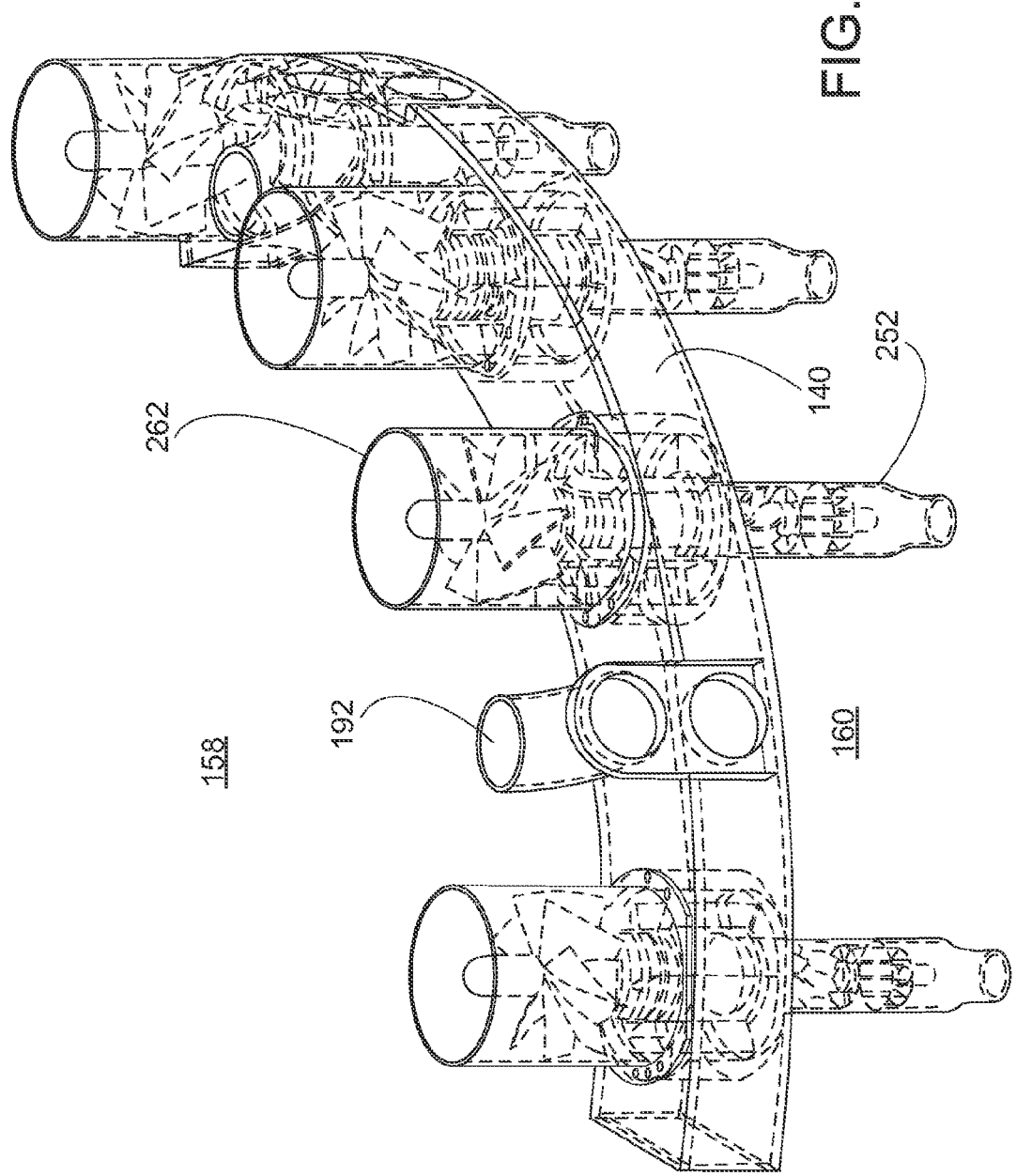

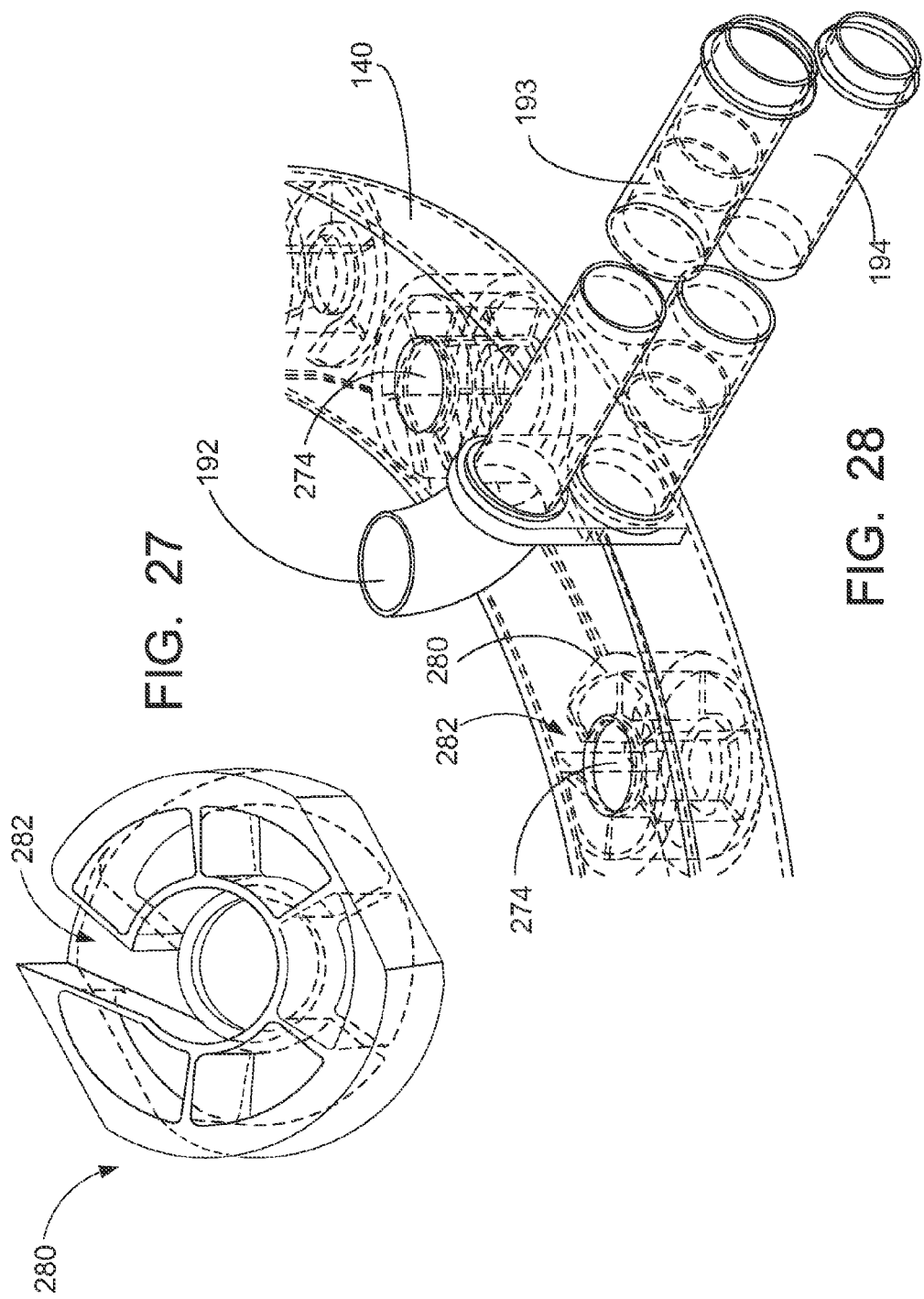

REACTOR COOLANT PUMP SYSTEM INCLUDING TURBO PUMPS SUPPLIED BY A MANIFOLD PLENUM CHAMBER

This application claims the benefit of U.S. Provisional Application No. 61/624,693 filed Apr. 16, 2012 and titled "REACTOR COOLANT PUMP SYSTEM INCLUDING TURBO PUMPS POWERED BY A MANIFOLD PLENUM CHAMBER". U.S. Provisional Application No. 61/624,693 filed Apr. 16, 2012 and titled "REACTOR COOLANT PUMP SYSTEM INCLUDING TURBO PUMPS POWERED BY A MANIFOLD PLENUM CHAMBER" is hereby incorporated by reference in its entirety into the specification of this application.

This application claims the benefit of U.S. Provisional Application No. 61/624,966 filed Apr. 16, 2012 and titled "COOLANT PUMP APPARATUSES AND METHODS OF USE FOR SMRS". U.S. Provisional Application No. 61/624,966 filed Apr. 16, 2012 and titled "COOLANT PUMP APPARATUSES AND METHODS OF USE FOR SMRS" is hereby incorporated by reference in its entirety into the specification of this application.

BACKGROUND

The following relates to the nuclear reactor arts, nuclear power generation arts, nuclear reactor hydrodynamic design arts, and related arts.

In nuclear reactor designs of the pressurized water reactor (PWR) type, a radioactive nuclear reactor core is immersed in primary coolant water at or near the bottom of a pressure vessel. The primary coolant is maintained in a compressed or subcooled liquid phase. In applications in which steam generation is desired, the primary coolant water is flowed out of the pressure vessel, into an external steam generator where it heats secondary coolant water flowing in a separate secondary coolant path, and back into the pressure vessel. Alternatively an internal steam generator is located inside the pressure vessel (sometimes called an "integral PWR" design), and the secondary coolant is flowed into the pressure vessel within a separate secondary coolant path in the internal steam generator. In either design, heated primary coolant water heats secondary coolant water in the steam generator to convert the secondary coolant water into steam. An advantage of the PWR design is that the steam comprises secondary coolant water that is not exposed to the radioactive reactor core.

In a typical PWR design configuration, the primary coolant flow circuit is defined by a cylindrical pressure vessel that is mounted generally upright (that is, with its cylinder axis oriented vertically). A hollow cylindrical central riser is disposed concentrically inside the pressure vessel. Primary coolant flows upward through the reactor core where it is heated and rises through the central riser, discharges from the top of the central riser and reverses direction to flow downward back toward the reactor core through a downcomer annulus defined between the pressure vessel and the central riser. This is a natural convection flow circuit that can, in principle, be driven by heat injection from the reactor core and cooling of the primary coolant as it flows upward and away from the reactor core. However, for higher power reactors it is advantageous or even necessary to supplement or supplant the natural convection with motive force provided by electromechanical reactor coolant pumps.

Most commercial PWR systems employ external steam generators. In such systems, the primary coolant water is pumped by an external pump connected with external piping running between the PWR pressure vessel and the external steam generator. This also provides motive force for circulating the primary coolant water within the pressure vessel, since the pumps drive the entire primary coolant flow circuit including the portion within the pressure vessel.

Fewer commercial "integral" PWR systems employing an internal steam generator have been produced. One contemplated approach is to adapt a reactor coolant pump of the type used in a boiling water reactor (BWR) for use in the integral PWR. Such arrangements have the advantages of good heat management (because the pump motor is located externally) and maintenance convenience (because the externally located pump is readily removed for repair or replacement).

However, the coupling of the external reactor coolant pump with the interior of the pressure vessel introduces vessel penetrations that, at least potentially, can be the location of a loss of coolant accident (LOCA).

Another disadvantage of existing reactor coolant pumps is that the pump operates in an inefficient fashion. Effective primary coolant circulation in a PWR calls for a pump providing high flow volume with a relatively low pressure head (i.e., pressure difference between pump inlet and outlet). In contrast, most reactor coolant pumps operate most efficiently at a substantially higher pressure head than that existing in the primary coolant flow circuit, and provide an undesirably low pumped flow volume.

Yet another disadvantage of existing reactor coolant pumps is that natural primary coolant circulation is disrupted as the primary coolant path is diverted to the external reactor coolant pumps. This can be problematic for emergency core cooling systems (ECCS) that rely upon natural circulation of the primary coolant to provide passive core cooling in the event of a failure of the reactor coolant pumps.

Another contemplated approach is to employ self-contained internal reactor coolant pumps in which the pump motor is located with the impeller inside the pressure vessel. However, in this arrangement the pump motors must be designed to operate inside the pressure vessel, which is a difficult high temperature and possibly caustic environment (e.g., the primary coolant may include dissolved boric acid). Electrical penetrations into the pressure vessel are introduced in order to operate the internal pumps. Pump maintenance is complicated by the internal placement of the pumps, and maintenance concerns are amplified by an anticipated increase in pump motor failure rates due to the difficult environment inside the pressure vessel. Still further, the internal pumps occupy valuable space inside the pressure vessel.

Disclosed herein are improvements that provide various benefits that will become apparent to the skilled artisan upon reading the following.

BRIEF SUMMARY

In one aspect of the disclosure, a nuclear reactor includes a nuclear core comprising a fissile material, and a pressure vessel containing the nuclear core immersed in primary coolant water. Turbo pumps disposed in the pressure vessel provide active circulation of primary coolant water in the pressure vessel. Each turbo pump includes a turbine driving an impeller. A manifold plenum chamber is disposed in the pressure vessel, and is in fluid communication with inlets of the turbines of the turbo pumps. An electrically driven pump operatively connected with the manifold plenum chamber to pressurize the manifold plenum chamber with primary coolant water. The turbo pumps may be disposed in openings passing through the manifold plenum chamber. The pressure vessel may be vertically oriented and cylindrical, with a cylindrical riser oriented coaxially inside, and the manifold plenum chamber may be annular and disposed in a downcomer annulus defined between the cylindrical riser and the cylindrical pressure vessel.

In another aspect of the disclosure, an apparatus comprises: a nuclear core comprising a fissile material; a pressure vessel containing the nuclear core immersed in primary coolant water; and a reactor coolant pump (RCP) assembly including a manifold plenum chamber disposed in the pressure vessel and containing pressurized primary coolant water at a pressure higher than the pressure of primary coolant water in the pressure vessel, and a plurality of turbo pumps disposed in the pressure vessel. Each turbo pump includes an impeller arranged to pump primary coolant water in the pressure vessel and a turbine in operative fluid communication with the manifold plenum chamber so as to be driven by pressurized primary coolant water in the manifold plenum chamber.

In another aspect of the disclosure, a method comprises: pressurizing a manifold plenum chamber disposed in a pressure vessel of a nuclear reactor using primary coolant water drawn from the pressure vessel such that the manifold plenum chamber contains pressurized primary coolant water at a pressure that is higher than the pressure of primary coolant water in the pressure vessel; and pumping primary coolant water in the pressure vessel through a primary coolant flow circuit using turbo pumps whose turbines are driven by the pressurized primary coolant water contained in the manifold plenum chamber.

In another aspect of the disclosure, an apparatus comprises: a nuclear core comprising a fissile material; a pressure vessel containing the nuclear core immersed in primary coolant water; a primary coolant water processing component located outside of the pressure vessel; and a coaxial pipe including an inner passage surrounded by an outer annulus. The coaxial pipe operatively connects the primary coolant water processing component with the pressure vessel, wherein one of the inner passage and the outer annulus conveys primary coolant water from the pressure vessel to the primary coolant water processing component, and wherein the other of the inner passage and the outer annulus conveys primary coolant water processed by the primary coolant water processing component from the primary coolant water processing component to the pressure vessel. In some embodiments the primary coolant water processing component comprises a pump that pumps primary coolant water.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

FIGS. 3 and 4 show two different perspective views of the turbo pump of the RCP of FIG. 1.

FIG. 5 shows an end view of the turbo pump of the RCP of FIG. 1.

FIGS. 15 and 16 shows perspective and sectional perspective views, respectively, of one of the turbo pumps of the first manifold-based embodiment.

FIG. 24 shows a perspective view of a portion of a nuclear reactor of a second manifold-based embodiment employing a manifold plenum chamber, with the pressure vessel shown in phantom and upper components omitted.

FIG. 25 shows a perspective view of a portion of the pressure vessel of the second manifold-based embodiment showing external headers for connecting the manifold plenum chamber with external pumps.

FIG. 26 shows a perspective view of a portion of the manifold plenum chamber with four turbo pumps of the second manifold-based embodiment.

FIG. 27 shows a perspective view of the operative connection of the manifold plenum chamber with an external pump in the second manifold-based embodiment.

FIG. 28 shows a perspective view of a flow distribution header disposed in the manifold plenum chamber of the second manifold-based embodiment.

DETAILED DESCRIPTION OF THE PREFERRED EMBODIMENTS

Figure 1:
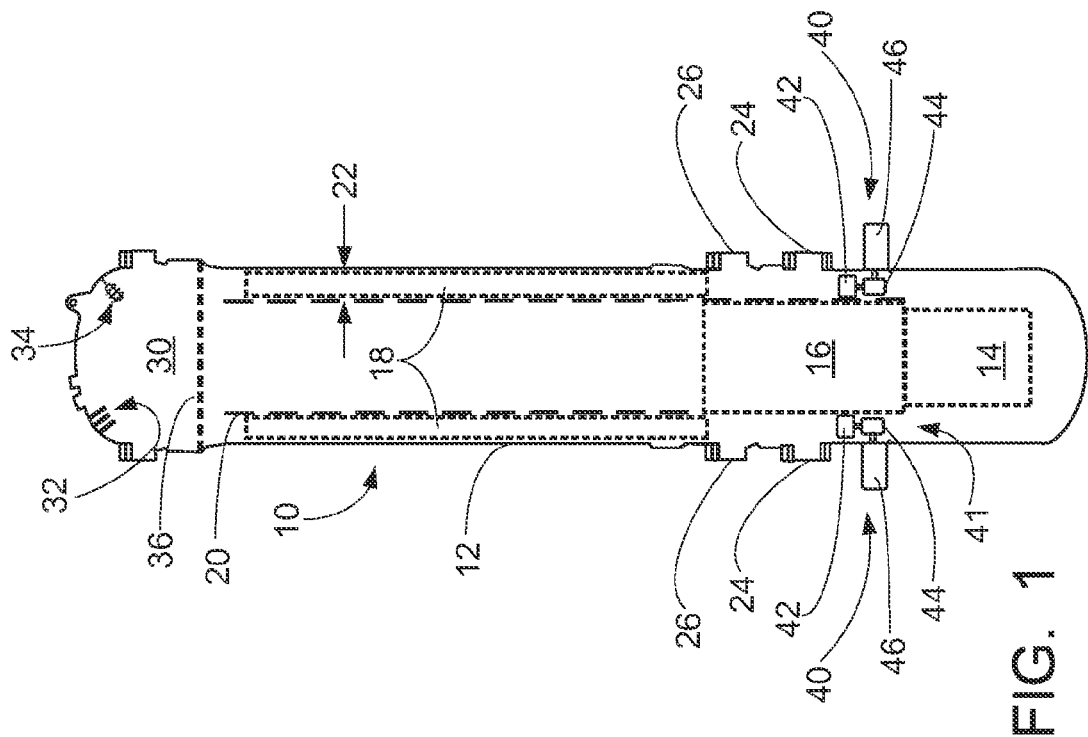
FIG. 1 diagrammatically shows a nuclear reactor including a reactor coolant pump (RCP) as disclosed herein.

With reference to FIG. 1, an illustrative nuclear reactor of the pressurized water reactor (PWR) type 10 includes a pressure vessel 12, which in the illustrative embodiment is a cylindrical vertically mounted vessel. As used herein, the phrase "cylindrical pressure vessel" or similar phraseology indicates that the pressure vessel has a generally cylindrical shape, but may in some embodiments deviate from a mathematically perfect cylinder. For example, the illustrative cylindrical pressure vessel 12 has a circular cross-section of varying diameter along the length of the cylinder, and has rounded ends, and includes various vessel penetrations, vessel section flange connections, and so forth. Similarly, although the pressure vessel 12 is upright, it is contemplated for this upright position to deviate from exact vertical orientation of the cylinder axis. For example, if the PWR is disposed in a maritime vessel then it may be upright but with some tilt, which may vary with time, due to movement of the maritime vessel on or beneath the water.

Selected components of the PWR that are internal to the pressure vessel 12 are shown diagrammatically in phantom (that is, by dotted lines). A nuclear reactor core 14 is disposed in a lower portion of the pressure vessel 12. The reactor core 14 includes a mass of fissile material, such as a material containing uranium oxide ($UO_2$) that is enriched in the fissile $^{235}U$ isotope, in a suitable matrix material. In a typical configuration, the fissile material is arranged as "fuel rods" arranged in a core basket. The pressure vessel 12 contains primary coolant water (typically light water, that is, $H_2O$, although heavy water, that is, $D_2O$, is also contemplated) in a subcooled state.

A control rods system 16 is mounted above the reactor core 14 and includes control rod drive mechanism (CRDM) units and control rod guide structures configured to precisely and controllably insert or withdraw control rods into or out of the reactor core 14. The illustrative control rods system 16 employs internal CRDM units that are disposed inside the pressure vessel 12. Some illustrative examples of suitable internal CRDM designs include: Stambaugh et al., "Control Rod Drive Mechanism for Nuclear Reactor", U.S. Pub. No. 2010/0316177 A1 published Dec. 16, 2010 which is incorporated herein by reference in its entirety; and Stambaugh et al., "Control Rod Drive Mechanism for Nuclear Reactor", Int'l Pub. WO 2010/144563 A1 published Dec. 16, 2010 which is incorporated herein by reference in its entirety. In general, the control rods contain neutron absorbing material, and reactivity is increased by withdrawing the control rods or decreased by inserting the control rods. So-called "gray" control rods are continuously adjustable to provide incremental adjustments of the reactivity. So-called "shutdown" control rods are designed to be inserted as quickly as feasible into the reactor core to shut down the nuclear reaction in the event of an emergency. Various hybrid control rod designs are also known. For example, a gray rod may include a mechanism for releasing the control rod in an emergency so that it falls into the reactor core 14 thus implementing a shutdown rod functionality. Internal CRDM designs have advantages in terms of compactness and reduction in mechanical penetrations of the pressure vessel 12; however, it is also contemplated to employ a control rods system including external CRDM located outside of (e.g., above) the pressure vessel and operatively connected with the control rods by connecting rods that pass through suitable mechanical penetrations into the pressure vessel.

The illustrative PWR 10 is an integral PWR, and includes an internal steam generator 18 disposed inside the pressure vessel 12. In the illustrative configuration, a central riser 20 is a cylindrical element disposed coaxially inside the cylindrical pressure vessel 12. (Again, the term "cylindrical" is intended to encompass generally cylindrical risers that deviate from a perfect cylinder by variations in diameter along the cylinder axis, inclusion of selected openings, or so forth). The riser 20 surrounds the control rods system 16 and extends upward, such that primary coolant water heated by the operating nuclear reactor core 14 rises upward through the central riser 20 toward the top of the pressure vessel, where it discharges, reverses flow direction and flows downward through an outer annulus defined between the central riser 20 and the cylindrical wall of the pressure vessel 12. The illustrative steam generator 18 is an annular steam generator disposed in a downcomer annulus 22 defined between the central riser 20 and the wall of the pressure vessel 12. The steam generator 18 provides independent but proximate flow paths for downwardly flowing primary coolant and upwardly flowing secondary coolant. The secondary coolant enters at a feedwater inlet 24, flows upward through the steam generator 18 where it is heated by the proximate downwardly flowing primary coolant to be converted to steam, and the steam discharges at a steam outlet 26.

FIG. 1 does not illustrate the detailed structure of the steam generator 18 or the secondary coolant flow path. For example, feedwater inlet tubes and/or a feedwater plenum convey feedwater from the inlet 24 to the bottom of the steam generator 18, and steam outlet tubes and/or a steam plenum convey steam from the top of the steam generator 18 to the steam outlet 26. Typically, the steam generator comprises steam generator tubes and a surrounding volume (or "shell") containing the tubes, thus providing two proximate flow paths that are in fluid isolation from each other. In some embodiments, the primary coolant flows downward through the steam generator tubes (that is, "tube-side") while the secondary coolant flows upward through the surrounding volume (that is, "shell-side"). In other embodiments, the primary coolant flows downward through the surrounding volume (shell-side) while the secondary coolant flows upward through the steam generator tubes (tube-side). In either configuration, the steam generator tubes can have various geometries, such as vertical straight tubes (sometimes referred to as a straight-tube once-through steam generator or "OTSG"), helical tubes encircling the central riser 20 (some embodiments of which are described, by way of illustrative example, in Thome et al., "Integral Helical Coil Pressurized Water Nuclear Reactor", U.S. Pub. No. 2010/0316181 A1 published Dec. 16, 2010 which is incorporated herein by reference in its entirety), or so forth.

The pressure vessel 12 defines a sealed volume that, when the PWR is operational, contains primary coolant water in a subcooled state. Toward this end, the PWR includes an internal pressurizer volume 30 disposed at the top of the pressure vessel 12 containing a steam bubble whose pressure controls the pressure of the primary coolant water in the pressure vessel 12. The pressure is controlled by suitable devices such as a heater 32 (e.g., one or more resistive heaters) that heats the steam to increase pressure, and/or a sparger 34 that injects cool water or steam into the steam bubble to reduce pressure. A baffle plate 36 separates the internal pressurizer volume 30 from the remainder of the sealed volume of the pressure vessel 10. By way of illustrative example, in some embodiments the primary coolant pressure in the sealed volume of the pressure vessel 12 is at a pressure of about 2000 psia and at a temperature of about 300° C. (cold leg just prior to flowing into the reactor core 14) to 320° C. (hot leg just after discharge from the reactor core 14). These are merely illustrative subcooled conditions, and a diverse range of other operating pressures and temperatures are also contemplated. Moreover, the illustrative internal pressurizer can be replaced by an external pressurizer connected with the pressure vessel by suitable piping or other fluid connections.

A reactor coolant pump (RCP) 40 is configured to drive circulation of primary coolant water in the pressure vessel 12. The reactor coolant pump comprises a hydraulically driven turbo pump 41 disposed in the pressure vessel. In a suitable embodiment, the turbo pump 41 includes an impeller 42 performing pumping of primary coolant water in the pressure vessel 12, and a hydraulically driven turbine 44 mechanically coupled with the impeller 42 to drive the impeller 42. A hydraulic pump 46 pumps primary coolant water to generate hydraulic working fluid that drives the turbine 42.

Figure 2:
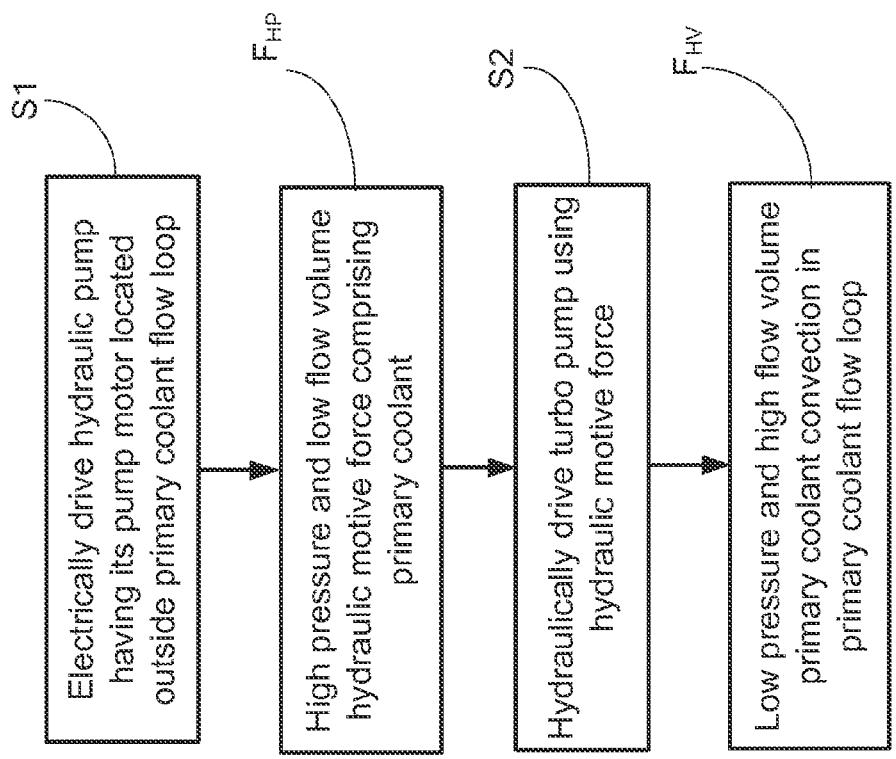
FIG. 2 diagrammatically shows operation of the RCP of FIG. 1.

With reference to FIG. 2, operation of the reactor coolant pump 40 is described. In an operation S1, the hydraulic pump 46 is electrically driven. The pump motor of the hydraulic pump 46 is located outside the primary coolant flow loop, which has an advantage in that it is not exposed to the high temperature (e.g., 300-320° C. in some embodiments, although higher or lower coolant temperature is also contemplated) of the primary coolant. The hydraulic pump 46 operates to pump the primary coolant. However, it directly pumps only a relatively small portion of the total volumetric primary coolant flow passing downward through the downcomer annulus 22. The pumping S1 performed by the hydraulic pump 46 produces a high pressure flow $F_{HP}$ which however is a relatively low volume flow. In an operation S1, the turbo pump including the turbine 44 and impeller 42 acts as a flow transformer to convert the high pressure flow $F_{HP}$ to a higher volume (but lower pressure) flow $F_{HV}$. That is, in the operation S2 the high pressure flow $F_{HP}$ drives the turbine 44 which in turn drives the mechanically coupled impeller 42 to generate the high volume flow $F_{HV}$ which flows in the primary coolant flow loop (e.g., down the downcomer annulus 22).

With reference to FIGS. 3-6, an illustrative embodiment of the turbo pump is shown. Hydraulic working fluid W (diagrammatically indicated in FIG. 6) flows through an inlet 50 to a turbine chamber defined by a turbine housing 52. The flow of working fluid W into the turbine chamber causes a turbine rotor 54 to rotate in a rotational direction R indicated in FIG. 6. In the illustrative example of FIG. 6 (where the turbine housing 52 is shown in phantom to reveal internal components), the hydraulic working fluid W is injected into the turbine chamber on the side in a tangential direction to the turbine rotor 54. The hydraulic working fluid W imparts momentum to turbine blades of the turbine rotor 54. The turbine blades are shaped to convert the momentum of the working fluid W into the rotation R, and also to redirect the flow of the working fluid W generally toward an outlet 56 of the turbine 44. (Note that the outlet 56 is visible in FIGS. 3 and 6 but not in FIGS. 4 and 5.) The turbine blades may, for example, be of the axial or tangential or centrifugal type, or a combination thereof, with gaps or so forth in order to produce the desired combination of imparting the rotational force on the rotor 54 and redirecting flow of the working fluid W toward the outlet 56. The working fluid W discharges out of the turbine 44 via the outlet 56, which is on the opposite end of the turbine 44 from the flow impellor 42.

The turbine rotor 54 is mounted on a shaft 60, and the impellor 42 mounted on the same shaft 60 as the turbine rotor 54—therefore, the impeller 42 rotates in same the rotational direction R as the turbine rotor 54. More generally, the hydraulically driven turbine 44 is mechanically coupled with the impeller 42 to drive the impeller 42. In the illustrative approach this mechanical coupling is via the common shaft 60; however, it is also contemplated to include a more complex coupling with gearing or so forth. The illustrative shaft 60 is supported in the turbine housing 52 by suitable bearings B1, B2.

Figure 6:
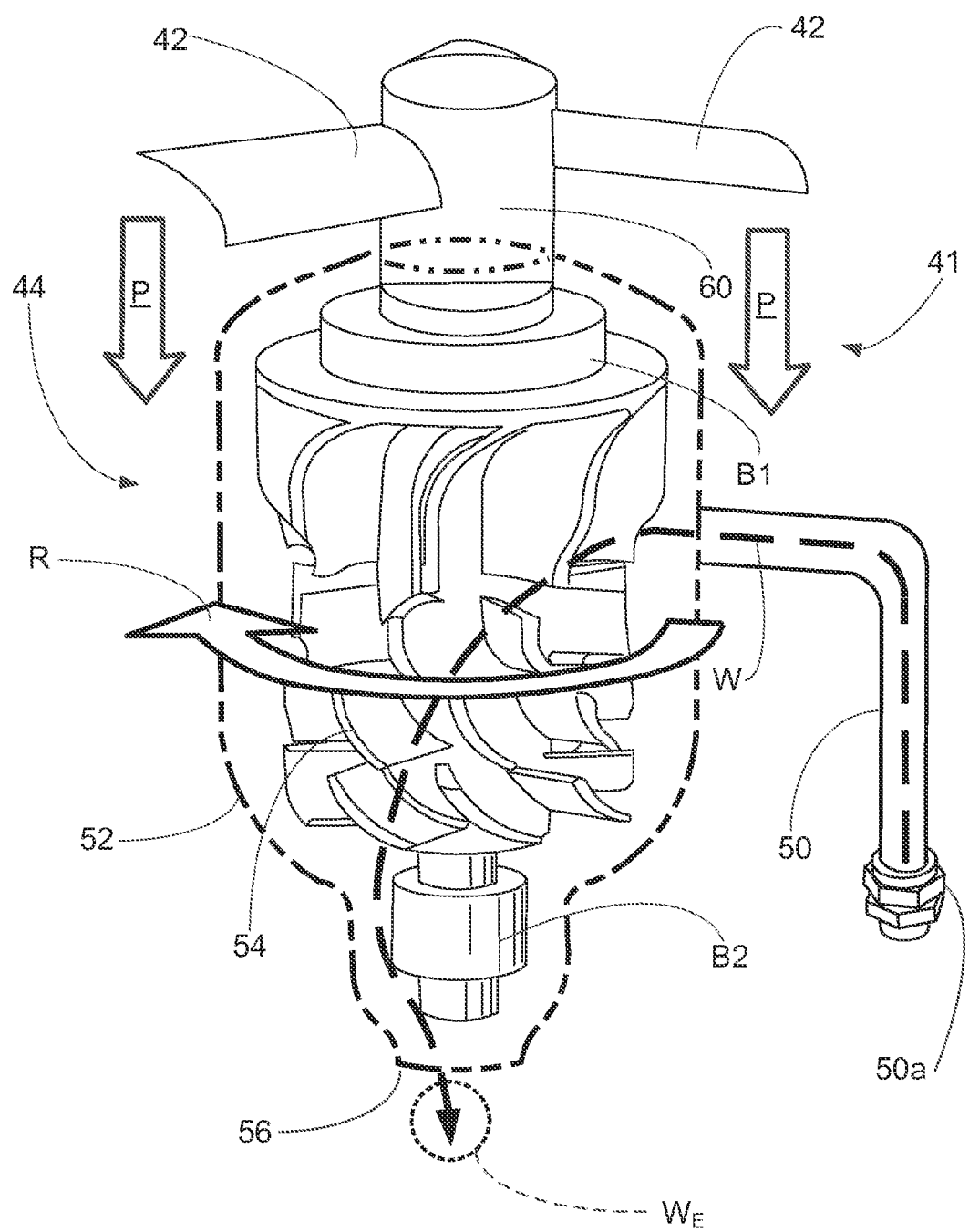
FIG. 6 shows a partial sectional view of the RCP of FIG. 1 with the impeller duct omitted.

The blades of the impeller 42 are immersed in the primary coolant, and are shaped such that they drive a primary coolant flow P as shown in FIG. 6. In the illustrative example, the impeller 42 directs the primary coolant flow P across the turbine housing 52 in the same general direction as the turbine exhaust $W_E$ discharged from the outlet 56 by the turbine 44 (see FIG. 6). The illustrative impellor 42 is of the axial flow type, although other impellor types with radial (centrifugal) flow characteristics, mixed radial/axial flow characteristics, or so forth may be employed. The impeller 42 is enclosed within a tubular housing or impellor duct 62 (omitted in FIG. 6, and shown in partial phantom in FIGS. 3 and 4, to reveal internal components). In the embodiment of FIGS. 2-6 the impeller duct 62 is secured to the turbine housing 52 by four connecting plate members 64 radially spaced apart by 90° intervals; alternatively, in other embodiments the impeller duct may be secured elsewhere, or may be omitted entirely.

The impeller 42 directs the primary coolant flow P across the turbine housing 52 in the same general direction as the turbine exhaust $W_E$ discharged from the outlet 56 by the turbine 44. Thus, the turbine exhaust flow $W_E$ additively combines with the primary coolant flow P to form the total discharge from the turbo pump. This is advantageous assuming that the electrically driven hydraulic pump 46 supplies the hydraulic working fluid W as primary coolant and/or as make-up water for making up lost primary coolant. In this arrangement, there is a single fluid connection, namely the inlet 50, connecting (via a connecting apparatus 50a in some embodiments) the electrically driven hydraulic pump 46 and the turbo pump 41 (or, more specifically, a single fluid connection 50 connecting the hydraulic pump 46 and the turbine 44). In particular, the outlet 56 is not connected with the hydraulic pump 46.

Figure 7A:
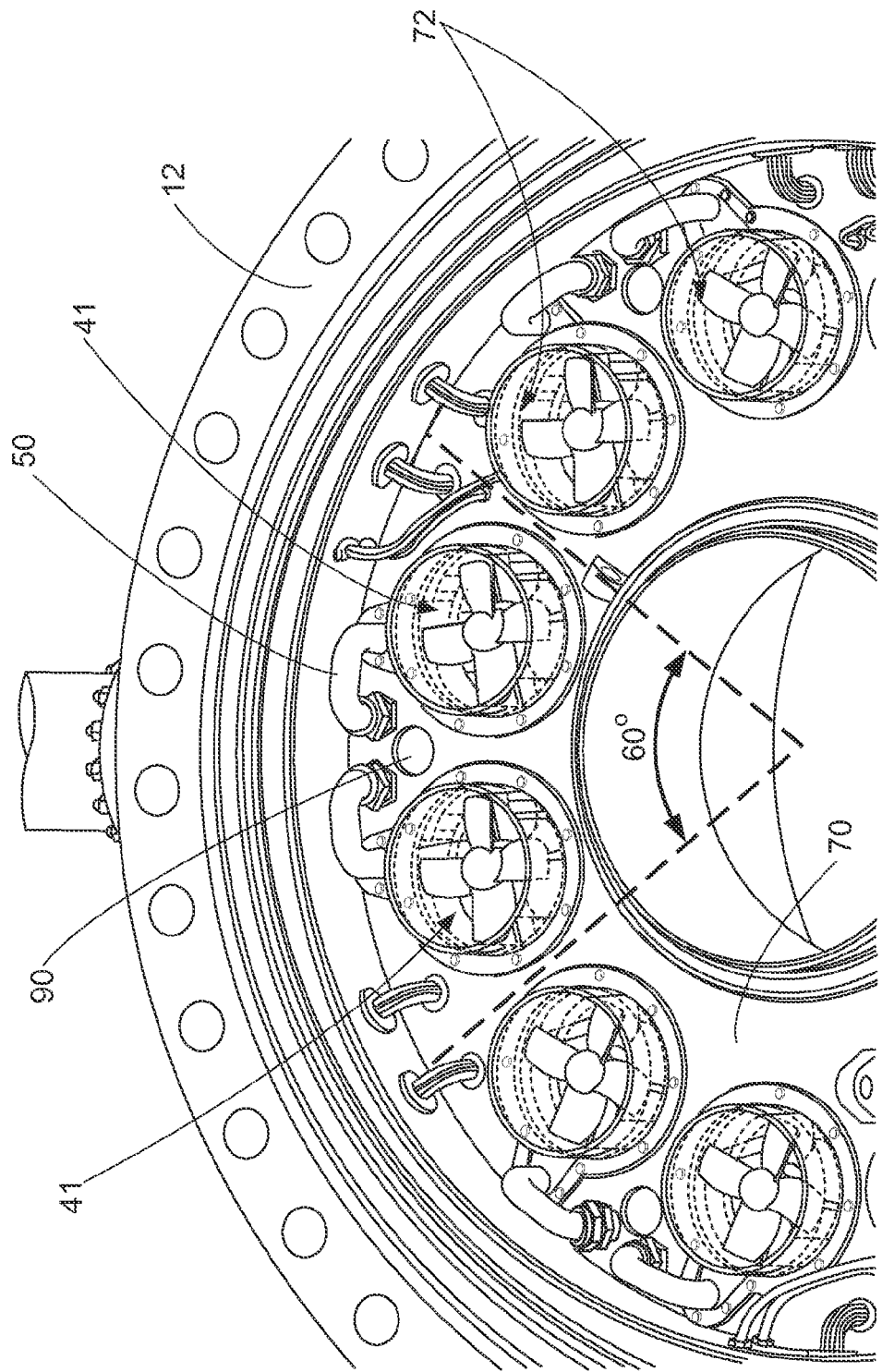
FIG. 7A diagrammatically shows a plan view of a lower vessel section of a nuclear reactor as disclosed herein.
Figure 7B:
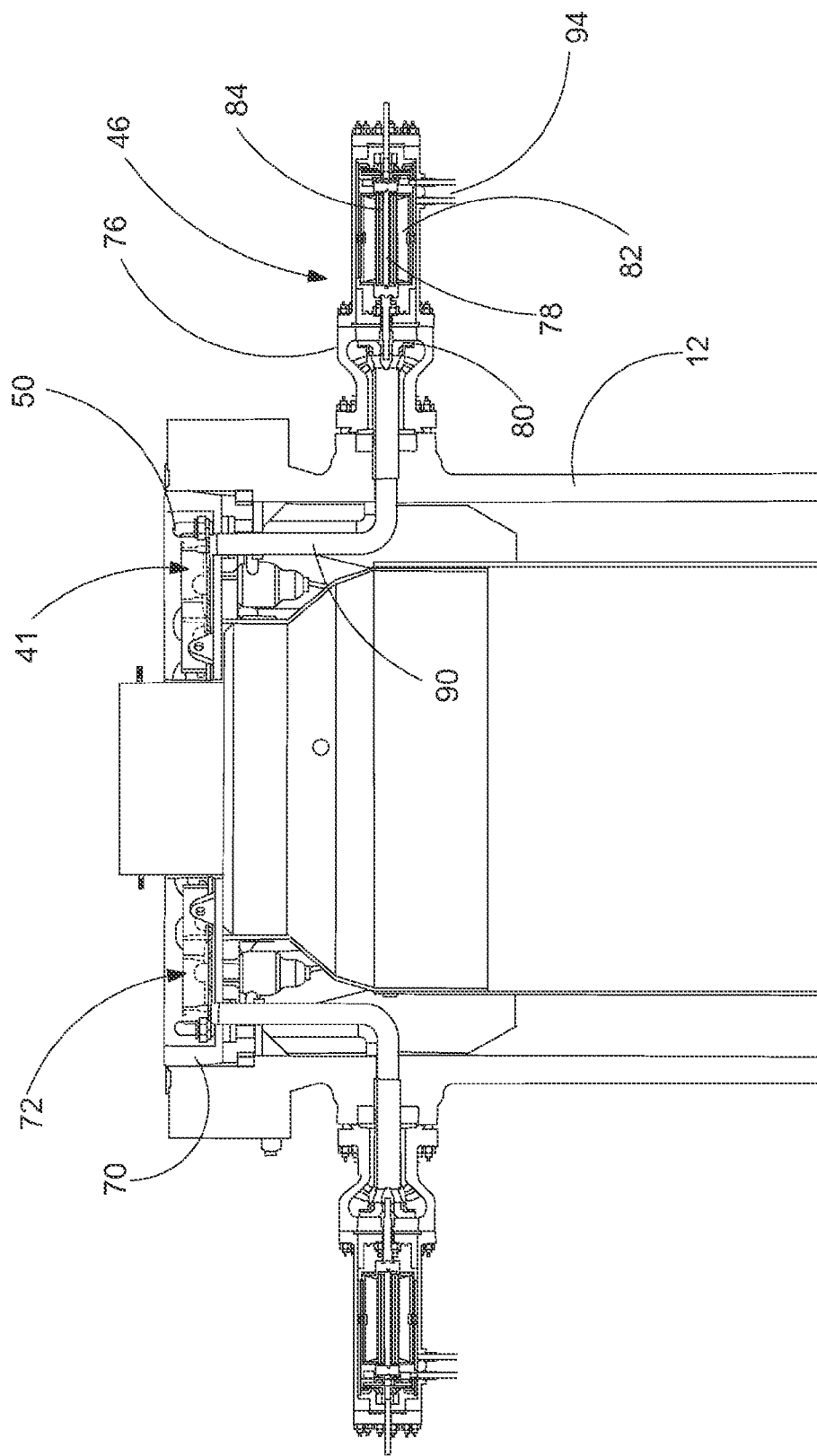
FIG. 7B diagrammatically shows a cross sectional side view of a lower vessel portion of a nuclear reactor as disclosed herein
Figure 8:
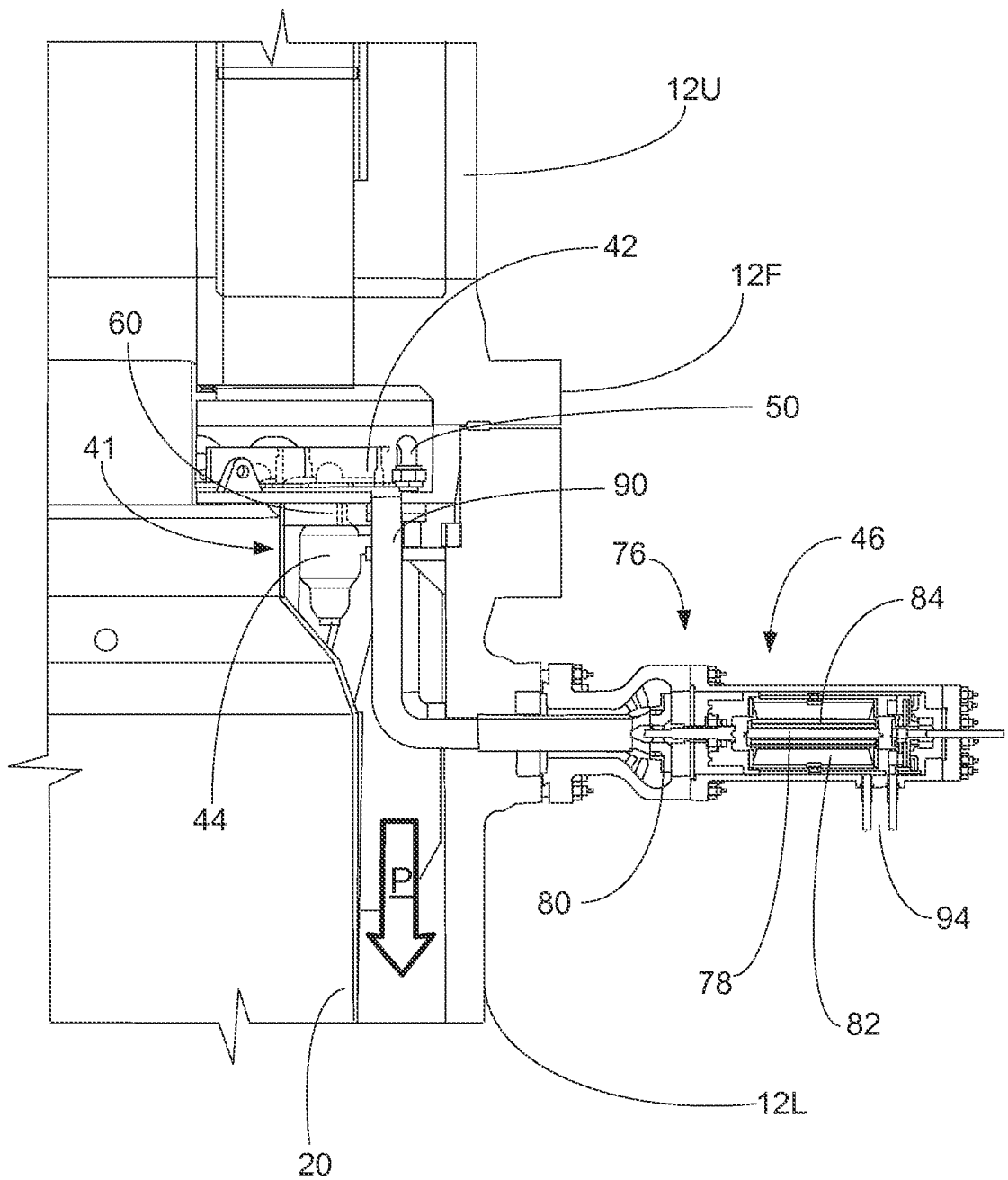
FIGS. 8 and 9 show side and perspective views, respectively of the two RCPs shown in FIG. 7A.
Figure 9:
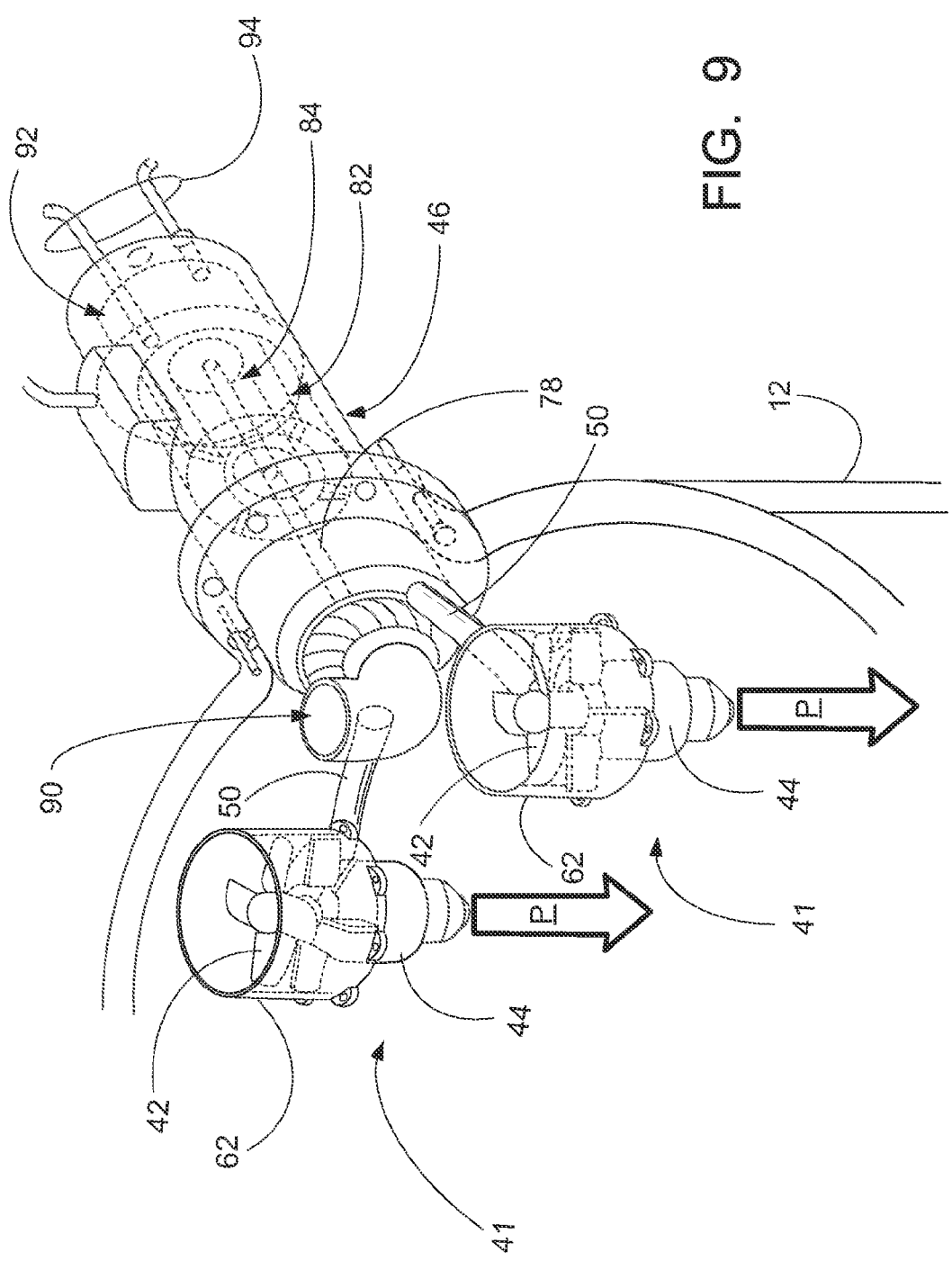

With reference to FIG. 7-9, a suitable arrangement of the pumps shown in FIGS. 3-6 in the PWR of FIG. 1 is shown in further detail. An annular plate 70 is disposed in the downcomer annulus 22. Each turbo pump is mounted at an opening 72 of the annular plate 70. In the illustrative arrangement, each electrically driven hydraulic pump 46 drives the turbines 44 of two turbo pumps 41. The annular plate 70 includes twelve openings 72 for supporting twelve turbo pumps; however, other numbers of turbo pumps (including as few as a single turbo pump) may be employed, and the turbo pump-to-hydraulic pump ratio may be 1:1, 2:1 (as shown in FIG. 7), 3:1, or so forth, depending upon the load capacity of the hydraulic pumps. In addition to providing a mounting structure for the turbo pumps, the annular plate 70 separates the high pressure side (above the plate 70) and low pressure side (below the plate 70) of the turbo pumps 41. Toward this end, in some embodiments the impeller ducts 62 are sized to mate with the openings 72 so that primary coolant flow is limited to going through the impeller ducts 62 or through the inlet 90 to form the hydraulic working fluid W.

The illustrative electrically driven hydraulic pumps 46 are external canned motor pumps that feed the inlets 50 of two turbines 44 with relatively short hydraulic lines that are internal to the pressure vessel 12. The canned motor pumps are suitably mounted on respective flanged openings in the pressure vessel 12. In these embodiments a canned motor pump housing 76 of the pump 46 is part of the primary pressure boundary also including the pressure vessel 12. In these canned pump designs, there is no seal between the shaft 78 of the working fluid pump 80 and the motor (comprising a stator 82 and a rotor 84). The internals of the electrically driven hydraulic pump 46 are wet at the primary pressure. This type of pump is known for use as boiler circulation pumps. The canned motor pump external housing 76 is effectively an extension of the reactor vessel primary boundary defined by the pressure vessel 12.

In operation, a portion of the primary coolant flow P flowing downward in the downcomer annulus 22 is captured by an inlet 90 and flows into the electrically driven hydraulic pump 46. This captured primary coolant forms the hydraulic working fluid W, and is pressurized by operation of the hydraulic pump 46 (and more particularly by the operation of the working fluid pump 80 driven by the motor 82, 84). The pump 80 discharges the working fluid W into the inlet 50 of the turbine 44 where it drives the turbine rotor 54 (see FIG. 6) and the impeller 42 via the common driveshaft 60. In some embodiments, about ⅛th (i.e., about 10-15%) of the primary coolant flow P is captured by the inlet 90 and forms the working fluid W. An off-the-shelf boiler circulation pump typically has a head of around 200 psi, whereas some contemplated small modular reactor (SMR) designs of the integral PWR type are expected to have a head of about 21 psi. Thus, an off-the-shelf canned motor pump of the type commonly used for boiler circulation is expected to be well-suited for use as the electrically driven hydraulic pump 46.

With particular reference to FIG. 8, in some embodiments the pressure vessel 12 is constructed in two sections, i.e. an upper section 12U and a lower section 12L, that are joined at a vessel flange 12F. In such embodiments the turbo pump 41 is readily accessible when the upper pressure vessel section 12U is lifted off by a crane or other lifting device during maintenance operations. Alternatively, access may be provided by manways, or the RCPs 40 may be located closer to the top of the pressure vessel and be accessible when a vessel head is lifted off for maintenance.

In the illustrative embodiment in which the electrically driven hydraulic pumps 46 are canned pumps, the pumps 46 are expected to receive a substantial amount of heat from the reactor. Accordingly, in some embodiments provision is made for cooling the electrically driven hydraulic pumps 46. In the illustrative embodiment, a heat exchanger 92 is employed for this purpose. The "hot" side of the heat exchanger 92 flows fluid from inside the pump 46, while the "cold" side of the heat exchanger 92 is cooled by active flow of coolant delivered via coolant lines 94.

The RCP embodiments described with reference to FIGS. 1-9 provide numerous advantages. The design enables the electrically driven hydraulic pump 46 to operate at or near its point of optimal efficiency, while still providing high volume (but lower pressure) flow via the transformative action of the turbo pumps 41. In effect, the turbo pumps transform the excess pressure head of the pump 46 into volumetric flow. The external pump in the illustrative embodiment comprises a canned pump mounted on a flanged opening, which reduces vessel penetrations. Indeed, if the canned pump is treated as part of the pressure vessel boundary, then there are only the electrical penetrations for powering the canned pump 46. The turbo pumps located inside the pressure vessel 12 can have as few as a single moving part, if the impeller 42 and the turbine rotor 54 of the turbine 44 define a unitary rotating element. The RCPs are located in the reactor downcomer annulus 22, and so the RCPs can remain in place during refueling, and do not need to be removed to access the reactor core 14. On the other hand, the electrically driven hydraulic pumps 46 are mounted on an exterior flange and can be removed for repair or replacement without disassembling the reactor.

Figure 10:
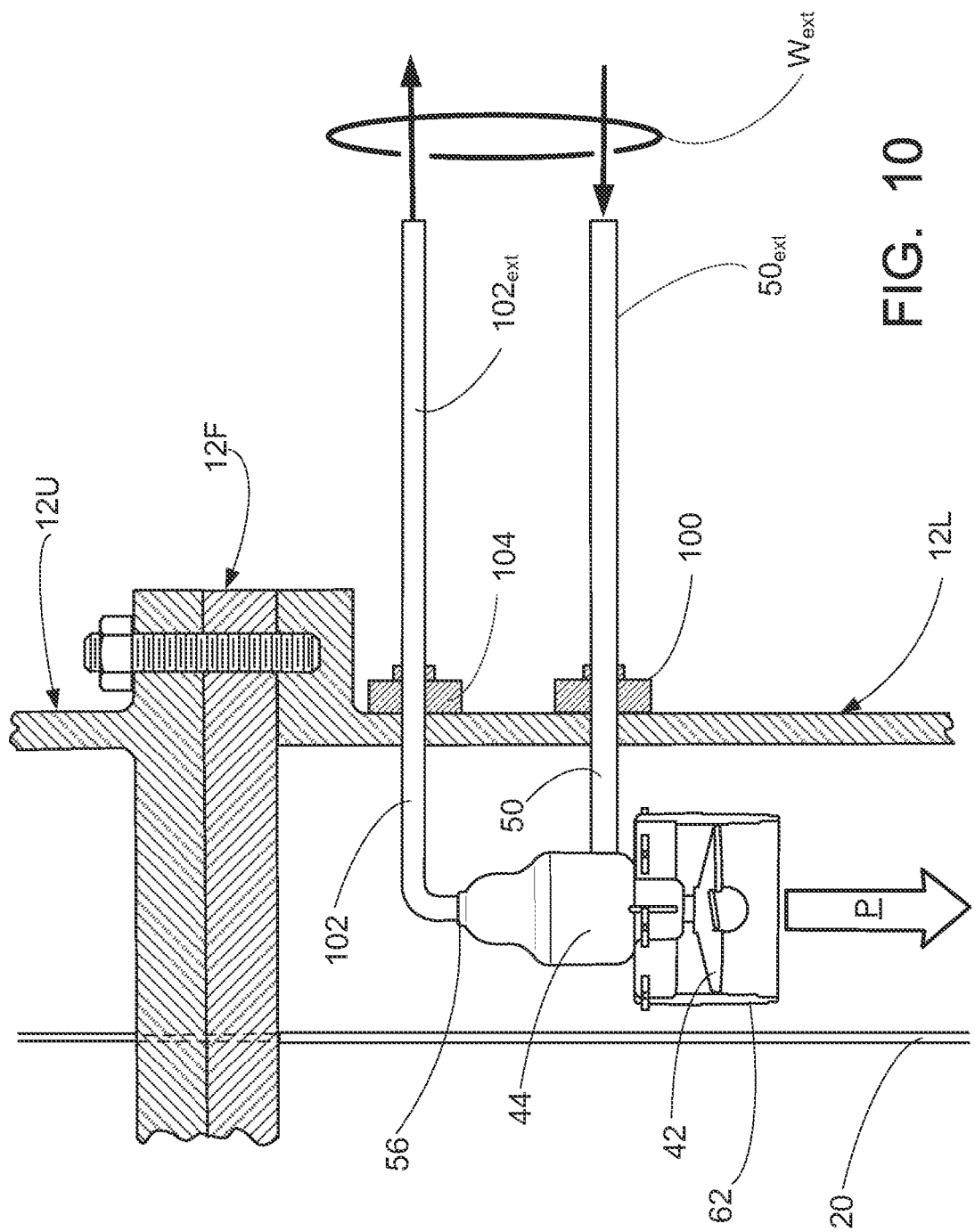
FIG. 10 shows a side view of an alternative RCP in which the canned pump of the embodiment of FIGS. 1-9 is replaced by an external hydraulic working fluid source.
Figure 12:
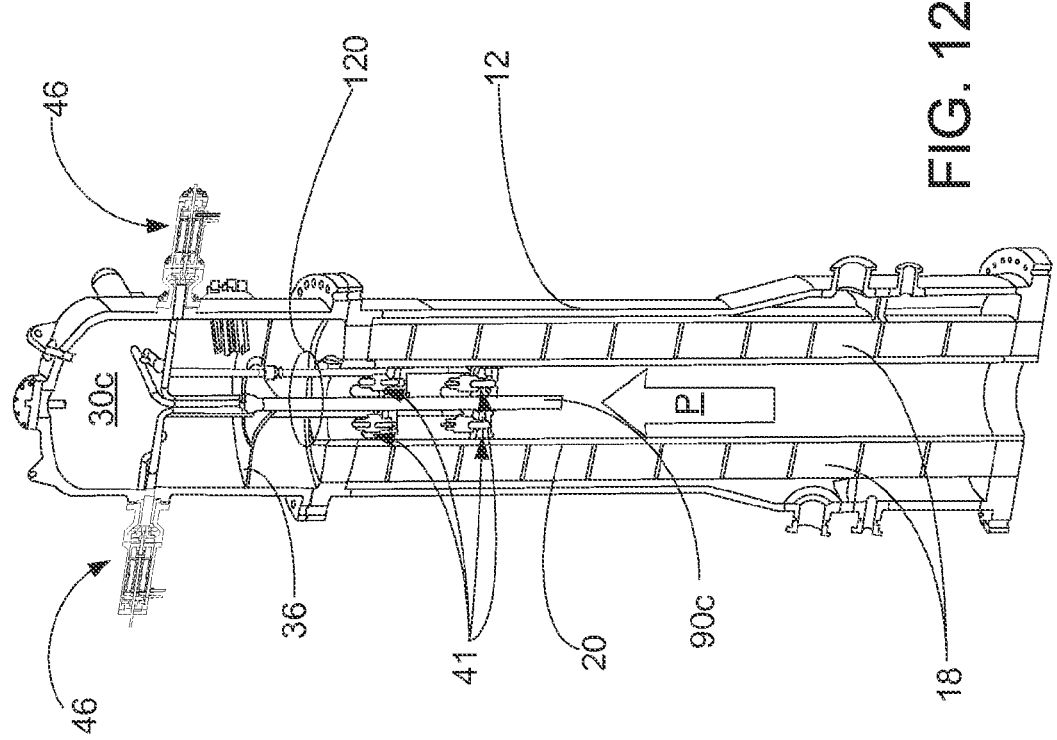
FIG. 12 shows a sectional perspective view of the assembly of FIG. 11 installed in the central riser, where only an upper portion of the nuclear reactor is shown.
Figure 11:
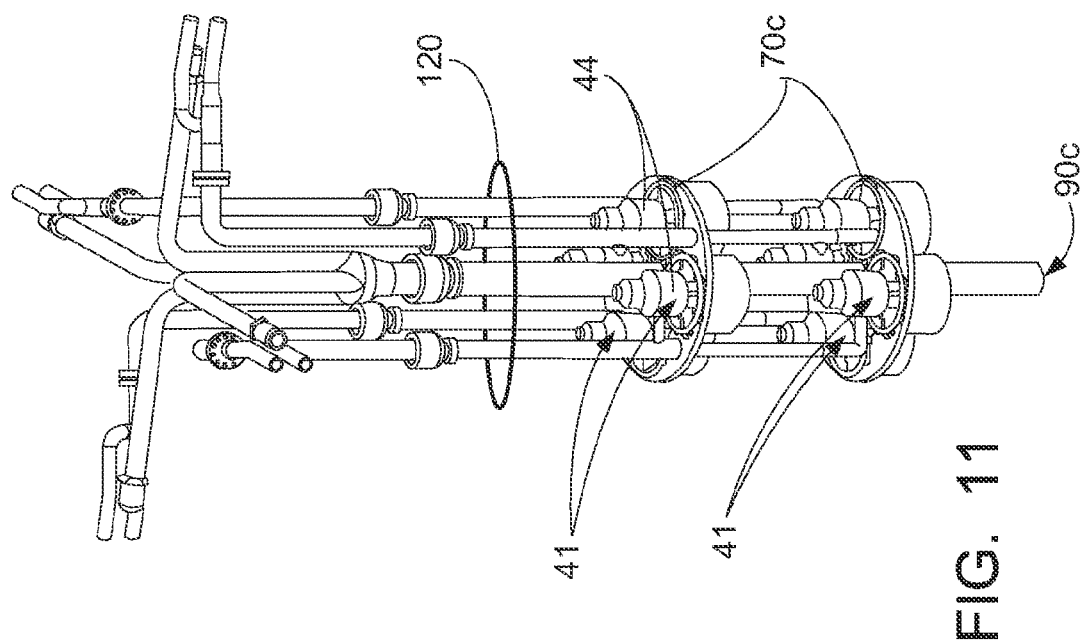
FIG. 11 shows a perspective view of an alternative turbo pumps assembly suitable for installation and operation inside the central riser of the nuclear reactor of FIG. 1.
Figure 13:
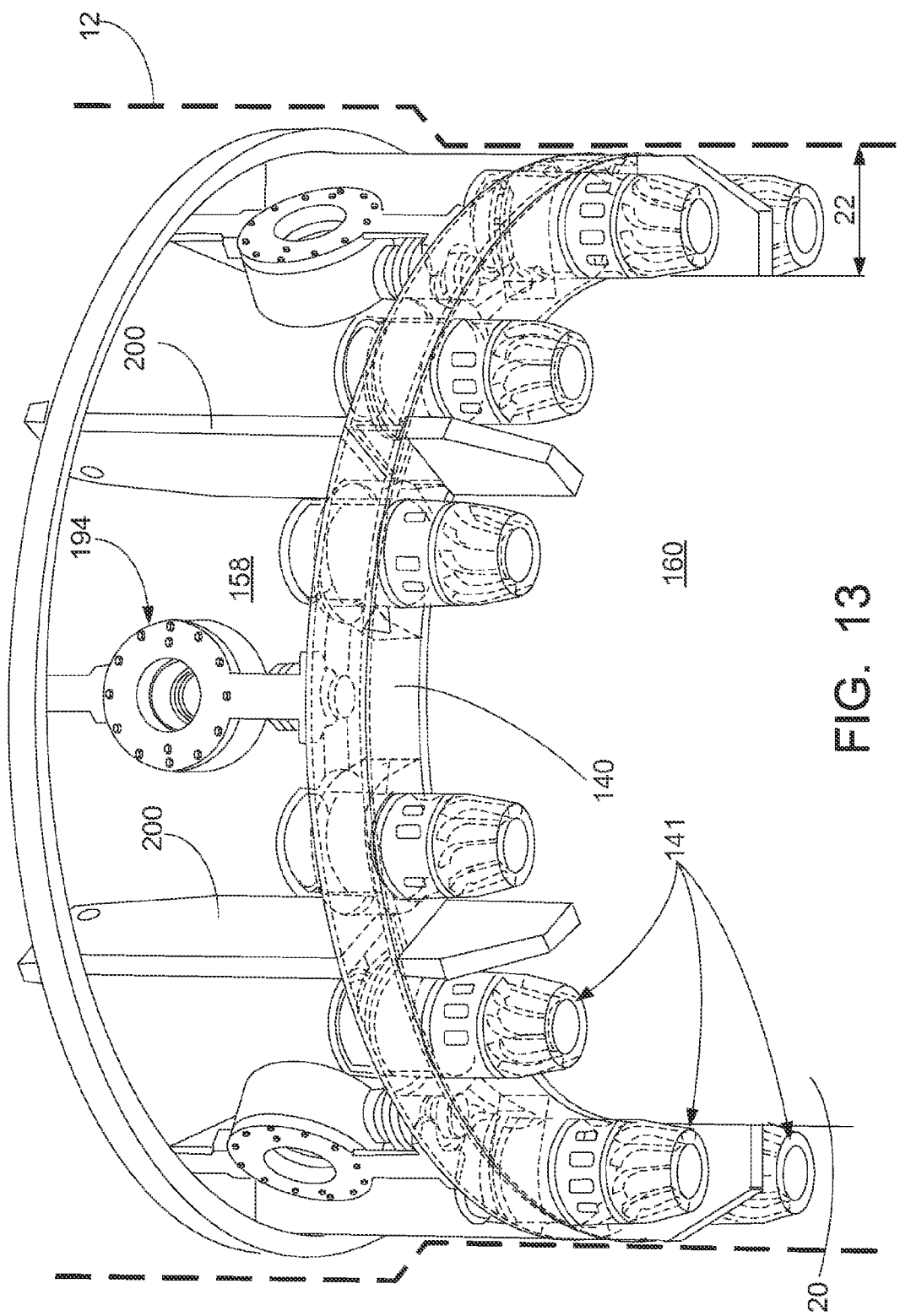
FIG. 13 shows a perspective view of a portion of a nuclear reactor of a first manifold-based embodiment employing a manifold plenum chamber, with the pressure vessel shown in phantom and upper components omitted.
Figure 14:
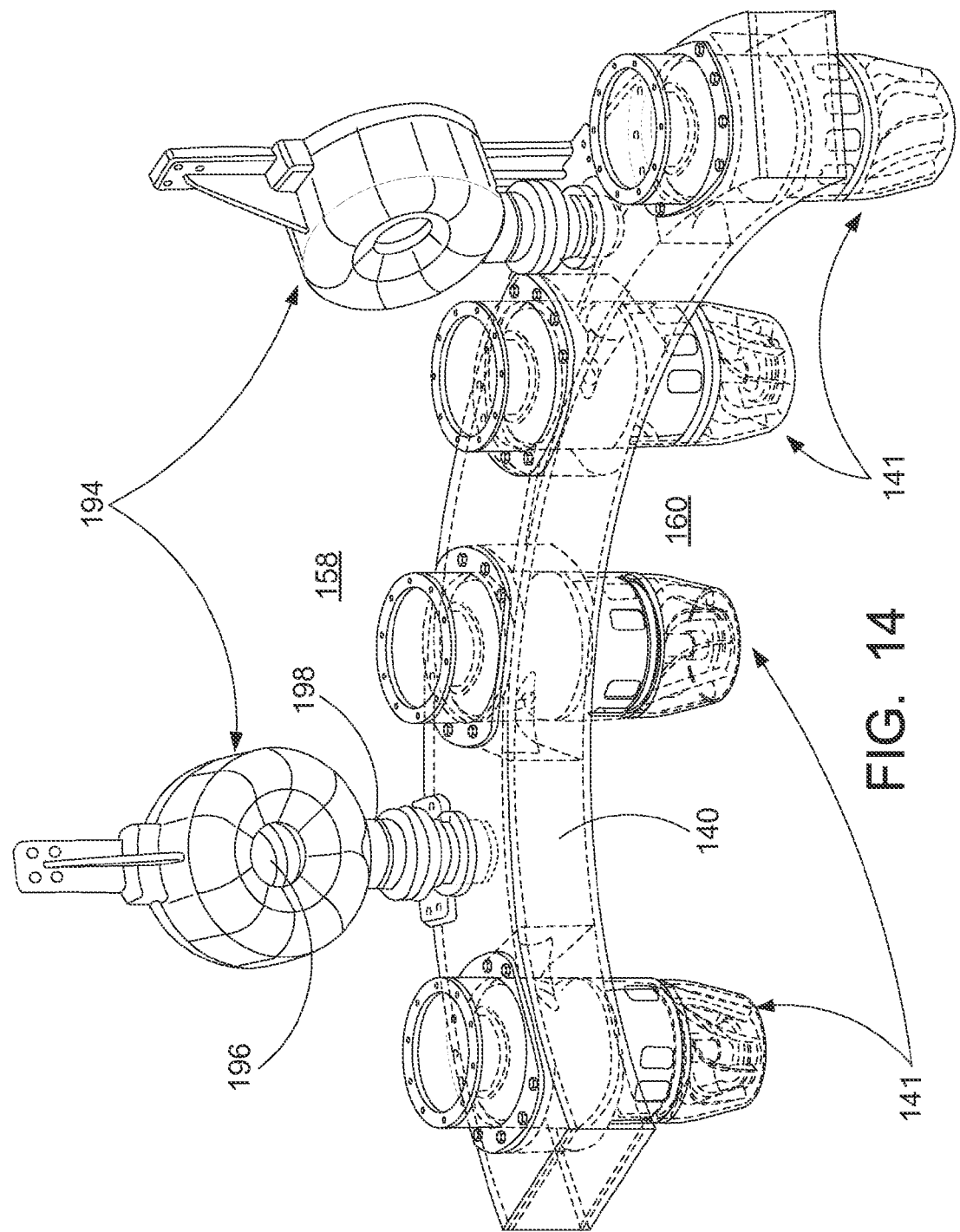
FIG. 14 shows a perspective view of a portion of the manifold plenum chamber with four turbo pumps of the first manifold-based embodiment.

The embodiments of FIGS. 1-9 are merely illustrative, and numerous variations are contemplated. For example, the illustrated canned pump embodiment of the electrically driven hydraulic pumps 46 can be replaced by dry pump, an external pump that is not mounted to the pressure vessel 12, or so forth. FIGS. 10-12 illustrate some variant embodiments.

With reference to FIG. 10, in one variant embodiment the canned electrically driven hydraulic pump 46 flange-mounted onto the pressure vessel 12 is replaced by an external source of hydraulic working fluid $W_{ext}$. Toward this end the inlet 50 is connected with a vessel penetration 100. At the exterior of the pressure vessel 12, an inlet pipe $50_{ext}$ supplying the working fluid $W_{ext}$ feeds into the vessel penetration 100. The outlet 56 of the turbine 44 in this embodiment is coupled by a short pipe 102 with a second vessel penetration 104. At the exterior of the pressure vessel 12, an outlet pipe $102_{ext}$ carries away the hydraulic working fluid $W_{ext}$ exiting from the turbine 44. Because in this embodiment the discharge from the outlet 56 of the turbine 44 does not add to the pumped primary coolant flow P, the embodiment of FIG. 10 optionally "flips" the turbo pump so that the impeller 42 discharges the primary coolant flow P away from the turbine 44. This also entails redesign of the impeller blades to optimize them for the orientation shown in FIG. 10.

The design of FIG. 10 has the disadvantage of introducing vessel penetrations 100, 104. However, these penetrations can be of small diameter so as to reduce the likelihood of and/or likely severity of a LOCA at these penetrations. An advantage of the design of FIG. 10 is that the external pipes $50_{ext}$, $102_{ext}$ provide flexibility as to the source of the working fluid $W_{ext}$. In some embodiments the working fluid may be primary coolant taken from a reactor coolant inventory and purification system (RCIPS). In other embodiments the working fluid $W_{ext}$ may be something other than reactor coolant, e.g. a separate water supply.

With reference to FIGS. 11 and 12, in another variant embodiment the turbo pumps are located inside the central riser 20, rather than being located in the annular downcomer annulus 22 as in the embodiments of FIGS. 1-10. The embodiment of FIGS. 11 and 12 is like the embodiment of FIGS. 1-19 in that a fraction of the primary coolant flow is captured and used as the hydraulic working fluid for driving the turbines 44. However, in the central riser, the pumped primary coolant flow P is upward. Accordingly, the inlet 90 (see, e.g. FIG. 9) is replaced by an inlet 90c embodied as an open lower end of a pipe centrally located inside the central riser 20. The turbo pumps 41 are also inverted as compared with the embodiment of FIGS. 1-9, so that the turbines 44 discharge upward in order to additively combine with the primary coolant flow P. Because the turbo pumps 41 located inside the central riser 20 are not proximate to the outer wall of the pressure vessel 12, a piping assembly 120 is provided to convey the captured primary coolant out to the electrically driven hydraulic pumps and to convey the resulting hydraulic working fluid back to the turbo pumps 41 inside the central riser 20.

In the alternative embodiment of FIGS. 11 and 12, the turbo-pumps 41 are mounted in the hot leg of the primary coolant flow circuit, that is, inside the central riser 20 in the illustrative embodiment. A configuration of eight turbo-pumps in two groups of four is shown in FIGS. 11 and 12. The open loop feed lines are routed through a modified pressurizer 30c at the top of the pressure vessel 12. The inlet 90c for the electrically driven hydraulic pump or pumps is embodied as the larger pipe in the center of the piping assembly 120. In the illustrative piping assembly 120, the inlet 90c branches to external hydraulic pumps 46. Four return lines each feed the turbines 44 of two turbo-pumps 41 so as to drive all eight turbo pumps 41.

In this configuration, the turbo-pumps 41 are mounted inverted (as compared with the embodiment of FIGS. 1-9) so that the impeller drives the primary coolant flow P upward and the turbines 44 discharge upward. The electrically driven hydraulic pumps are not shown in FIGS. 11 and 12, but are suitably mounted on the pressurizer 30c in either a vertical or horizontal orientation. These pumps could remain mounted on the pressurizer when the latter is lifted off and moved aside during refueling. (The electrical feeds and any heat exchanger cooling lines would likely be disconnected during this operation). Likewise, the connections to the turbo-pumps 41 optionally would remain intact during refueling.

In the embodiments of FIGS. 3-9, the electrically driven hydraulic pump 46 is connected with the turbo pump 41 by the inlet 50 to the turbine chamber defined by the turbine housing 52. In the embodiments of FIGS. 7-9, each hydraulic pump 46 drives two turbo pumps 41—more generally, the number of turbo pumps driven by a single hydraulic pump may be one, two (as per FIGS. 7-9), three, or more. Installation of the primary coolant pumping system of FIGS. 3-9 entails installing the annular plate 70 in the downcomer annulus 22, mounting the turbo pumps 41 in the openings 72 in the plate 70, mounting the hydraulic pumps 46 onto the pressure vessel 12, and installing the inlet piping 50 connecting the hydraulic pumps 46 with the turbo pumps 41. Such installation is complex, and additionally radial balance of the active primary coolant pumping is contingent upon balanced operation of the hydraulic pumps 46 that are spaced apart around the downcomer annulus 22. For example, as best seen in FIG. 7, the loss of a single one of the hydraulic pumps 46 would result in loss of primary coolant pumping in one-sixth of the circumference of the downcomer annulus 22. Loss of one of the turbo pumps 41 would also adversely affect operational balance, but less so because (1) the opening 72 in which the non-operating turbo pump is installed would continue to pass primary coolant and (2) there are twice as many turbo pumps as hydraulic pumps in this embodiment.

Figure 18:
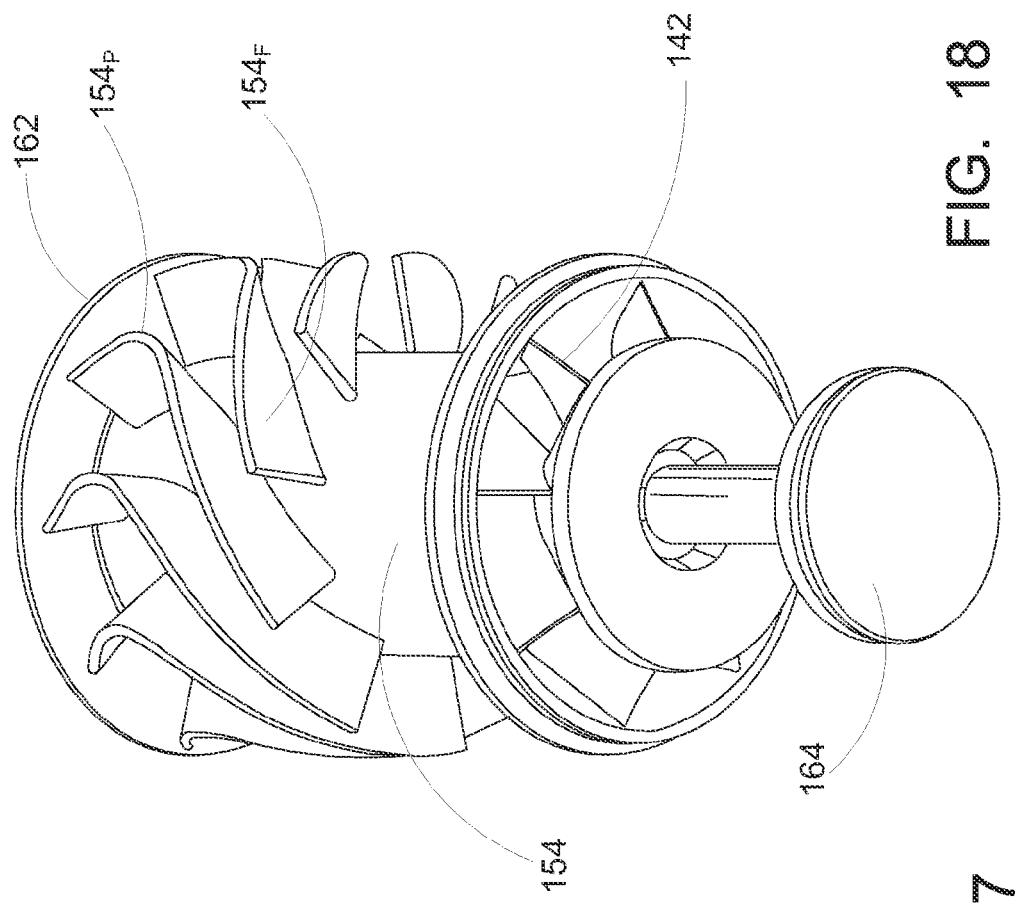
FIGS. 17 and 18 shows perspective views from different respective vantage points of the unitary turbine rotor/impeller element one of the turbo pumps of the first manifold-based embodiment.
Figure 17:
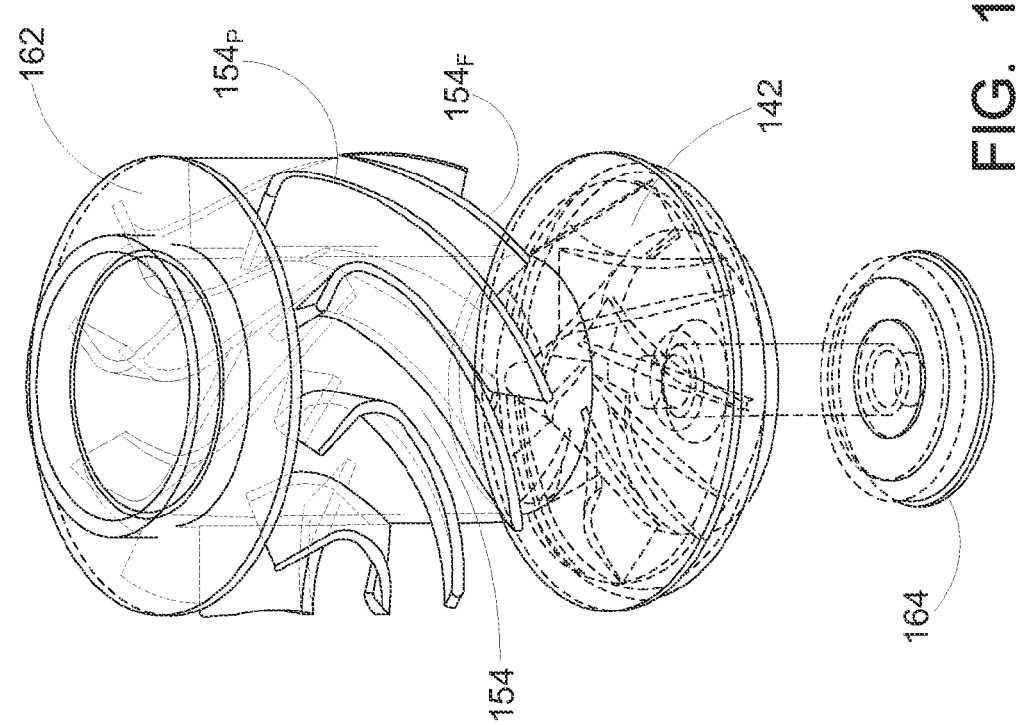
Figure 19:
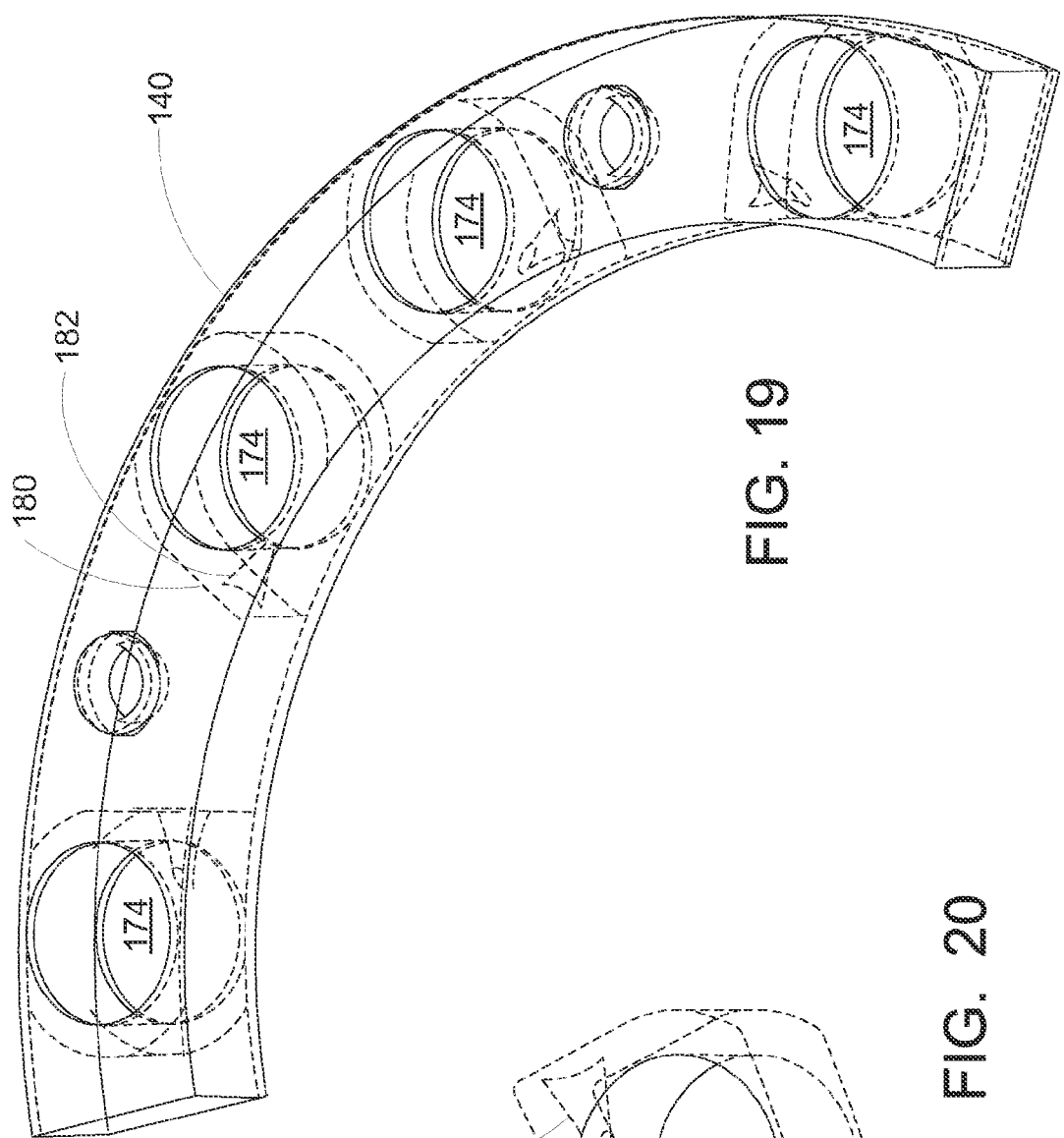
FIG. 19 shows a perspective view of a portion of the manifold plenum chamber of the first manifold-based embodiment with the turbo pumps removed.
Figure 20:
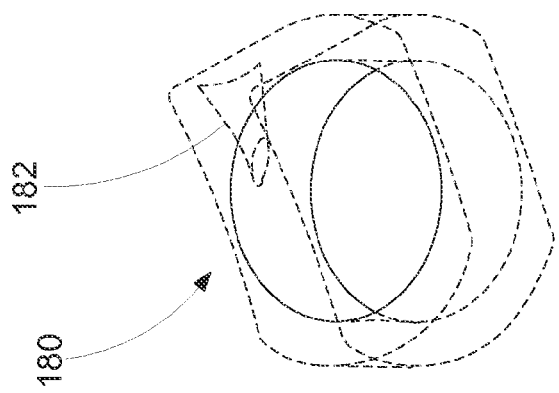
FIG. 20 shows a perspective view of a flow distribution header disposed in the manifold plenum chamber of the first manifold-based embodiment.

With reference to FIGS. 13-20, one approach for reducing these potential disadvantages is to employ a manifold plenum chamber 140 to drive the turbines. With particular reference to FIGS. 15-18, each illustrative turbo pump 141 includes an impeller 142 driven by a turbine 144. The turbo pump 141 includes a turbine inlet 150 passing into in a housing or casing 152 that defines both a turbine plenum and the flow path for the fluid pumped by the impeller 142. As best seen in FIGS. 17 and 18, the impeller 142 and a turbine rotor 154 are constructed as a unitary rotating element that is housed in the unitary housing or casing 152. Working fluid flowing into the turbine inlet 150 pushes against the blades of the turbine rotor 154 to cause it to rotate. The working fluid discharges from the turbine plenum defined by the housing or casing 152 via turbine outlets 156. The rotation also carries the impeller 142 which is part of the unitary rotataing element including the impeller 142 and turbine rotor 154. The rotation of the impeller 142 draws primary coolant water generally "downward" in the views shown in FIGS. 13-18, that is, pumps the primary coolant water from a suction side 158 to a discharge side 160.

The illustrative turbine rotor 154 has a hybrid Francis-Pelton design that combines the features of both a Francis and Pelton turbine. The curved shape of the blade portion 154$_P$ coincident with the inlet 150 captures the impulse similar to the cuplike shape of a Pelton turbine blade. The angled vane of the turbine blade portion 154$_F$ takes the downward annular flow and converts it to angular momentum similar to a Francis turbine. A space between the top of the turbine blade and a blocker disk 162 at the top of the turbine annulus provides relief of the flow from the Pelton turbine to distribute circumferentially for the Francis turbine stage. A disk 164 at the bottom of the rotating element connected via a shaft accommodates a main thrust bearing 166. The thrust bearing 166 and a radial bearing 168 are shown only in FIG. 16. On the bottom of the turbine annulus, the rotating barrel slopes outward to direct the turbine exhaust to the external housing outlet ports 156. Curved fixed vanes 170 span the annular space of the turbo pump outlet to transfer the load of the main thrust bearings 166 to the external housing 152.

The turbines 144 of the turbo pumps 141 are in operative fluid communication with the manifold plenum chamber 140 so as to be driven by pressurized primary coolant water in the manifold plenum chamber 140. The manifold plenum chamber 140 is a "plenum chamber" in that it is a pressurized housing or chamber containing pressurized primary coolant water at a pressure higher than the pressure of primary coolant water in the pressure vessel 12. The manifold plenum chamber 140 is a "manifold" plenum chamber in that it distributes the pressurized primary coolant water to the turbines 144 of the plurality of turbo pumps 141. The illustrative manifold plenum chamber 140 has an annular shape and fits into the downcomer annulus 22. The illustrative annular manifold plenum chamber 140 can comprise a single connected annular plenum, or alternatively one or more (or, more generally, N) "vertical" isolation plates may be disposed at selected positions around the annular manifold plenum chamber 140 to divide the plenum into N+1 mutually isolated pressurized volumes. The turbo pumps 141 are disposed in openings 174 (see FIG. 19) of the manifold plenum chamber 140 so that the combination of the manifold plenum chamber 140 and the turbo pumps 141 form a reactor coolant pump (RCP) assembly having the suction side 158 and the discharge side 160 on the opposite side of the RCP assembly from the suction side 158.

The manifold plenum chamber 140 serves the same purpose in the embodiment of FIGS. 13-20 as the inlet pipe 50 of embodiments of FIGS. 3-9, that is, the manifold plenum chamber 140 delivers pressurized primary coolant water to the turbine inlet 150 of the turbo pump 141. Toward this end, the turbo pumps 141 are disposed in openings 174 of the manifold plenum chamber 140 such that the manifold plenum chamber 140 encloses the inlets 150. In the illustrative embodiment, a flow distribution header 180 is disposed in the manifold plenum chamber 140 at each opening 174 in which a turbo pump 141 is installed. Each flow distribution header 180 includes an area-reducing nozzle 182 aligned with the inlet 150 of the turbine 144 of the respective turbo pump 141 to inject primary coolant water from the manifold plenum chamber 140 into the turbine 144 in a direction optimized to engage with the curved shape of the Pelton blade portion $154_P$.

Figure 21:
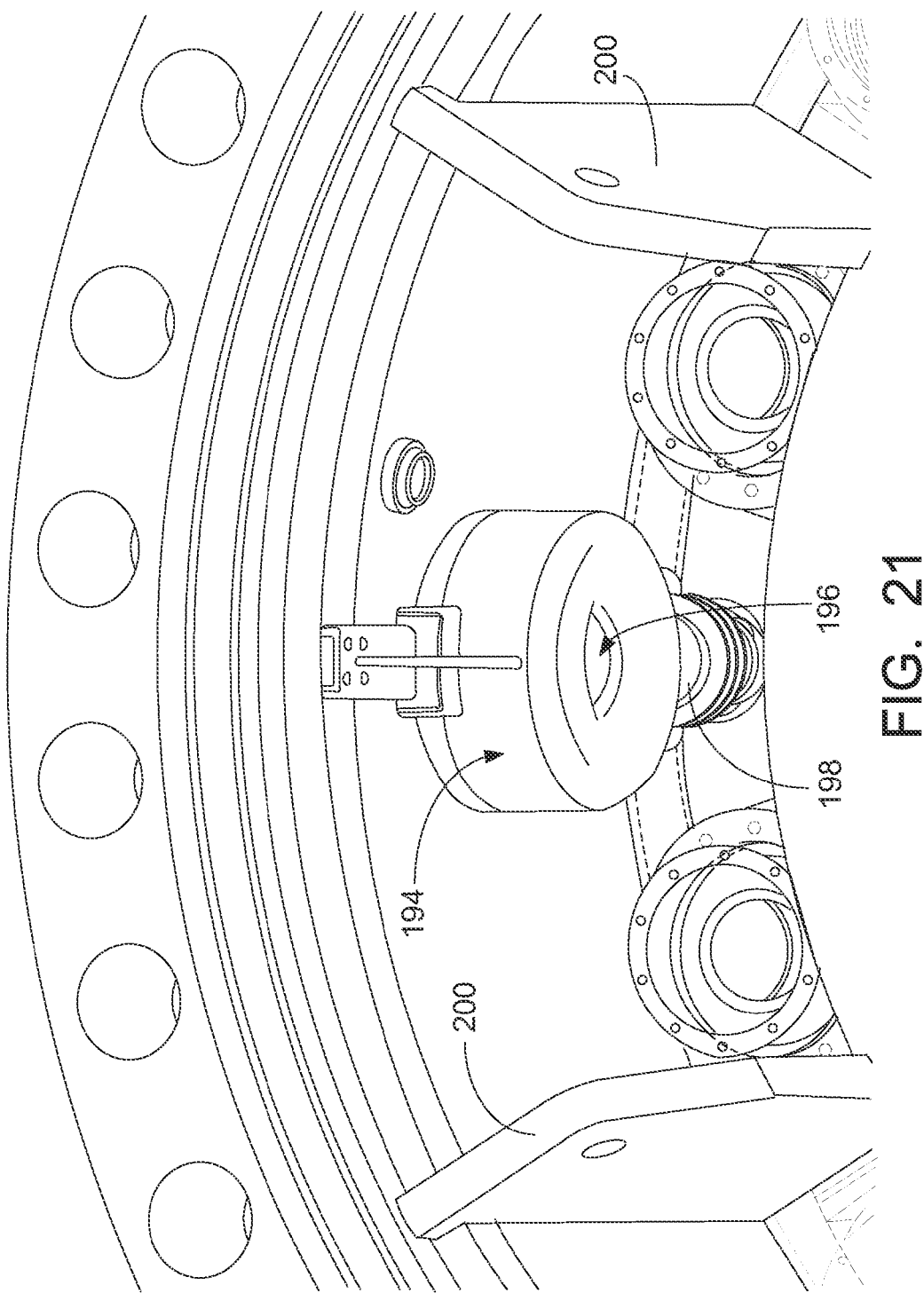
FIG. 21 shows a perspective view of a portion of the nuclear reactor of the first manifold-based embodiment focusing on the coaxial header.
Figure 22:
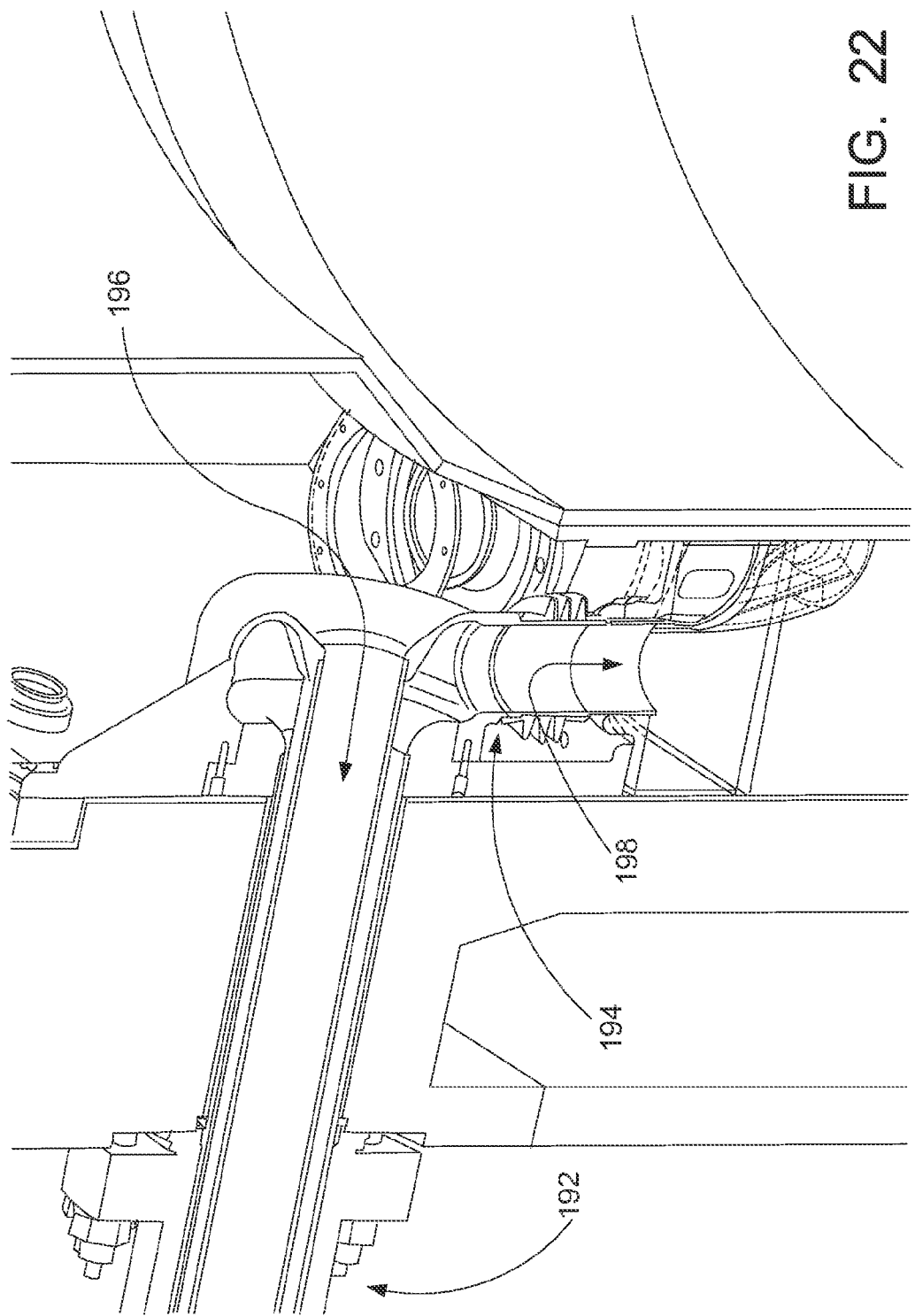
FIG. 22 shows a side sectional view of the coaxial operative connection between the electrically driven external pump and the manifold plenum chamber of the first manifold-based embodiment.
Figure 23:
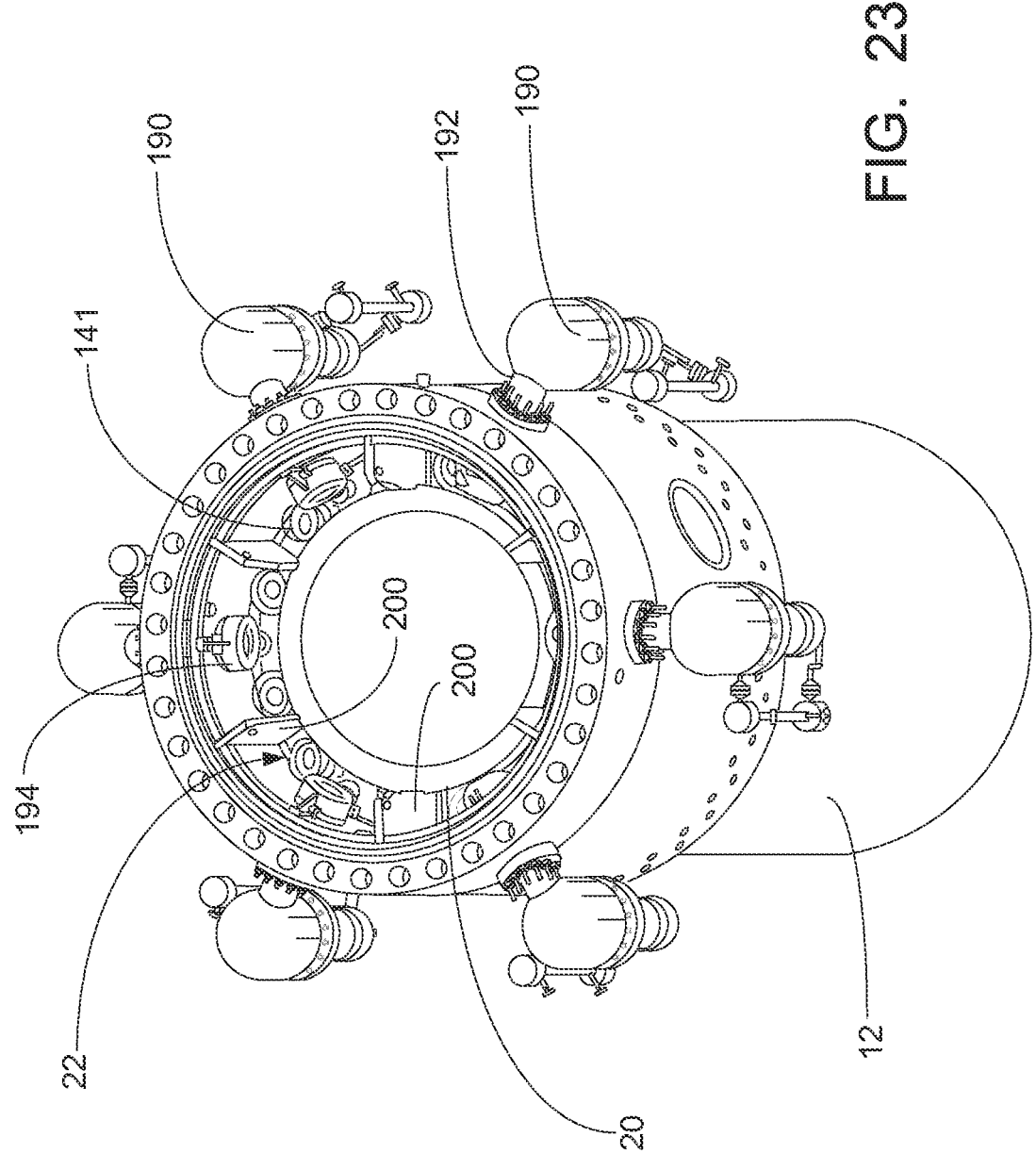
FIG. 23 shows a perspective view of a portion of the nuclear reactor of the first manifold-based embodiment including the external pumps, with the upper components omitted.

With continuing reference to FIGS. 13-20 and with further reference to FIGS. 21-23, the manifold plenum chamber 140 can be pressurized using any suitable pumping configuration. In general, the operational process comprises: (1) pressurize the manifold plenum chamber 140 disposed in the pressure vessel 12 using primary coolant water drawn from the pressure vessel 12 (and more particularly from the suction side 158) such that the manifold plenum chamber 140 contains pressurized primary coolant water at a pressure that is higher than the pressure of primary coolant water in the pressure vessel 12; and (2) pump primary coolant water in the pressure vessel 12 through the primary coolant flow circuit (e.g., flowing upward from the reactor core 14 through the central cylindrical riser 20 and back down through the downcomer annulus 22 back to the reactor core 14) using the turbo pumps 141 whose turbines 144 are driven by the pressurized primary coolant water contained in the manifold plenum chamber 140.

In the illustrative example, electrically driven hydraulic pumps 190 draw primary coolant from the pressure vessel and pump the primary coolant into the manifold plenum chamber 140 in order to pressurize the manifold plenum chamber 140. As shown in FIG. 23, in the illustrative example of FIGS. 13-20 the pumps 190 are external pumps. With particular reference to FIGS. 21 and 22, each external pump 190 is operatively connected via a coaxial pipe 192 and a coaxial header 194. Primary coolant water is drawn into the pump 190 via an inlet 196 of the coaxial header 194 and flows through the inner passage of the coaxial pipe 192 to the pump 190. The pumped primary coolant water flows back through the outer annulus of the coaxial pipe 192 and down an outlet 198 into the manifold plenum chamber 140. Alternatively, it is contemplated to employ the inner passage of the coaxial pipe as the outlet (flowing from the pump to the reactor pressure vessel) and the outer annulus of the coaxial pipe as the inlet (flowing from the pressure vessel to the pump). The coaxial pipe 192 and coaxial header 194 advantageously requires only one circular opening in the reactor vessel 12 for both inlet and outlet. This arrangement reduces the likelihood of a loss of coolant accident (LOCA) at this vessel penetration, and reduces the volumetric throughput in the event that a LOCA does occur there.

It will be appreciated that more generally the coaxial pipe 192 including an inner passage surrounded by an outer annulus can be used to connect a primary coolant water processing component (such as the illustrative pump 190, or a component that adds a selected constituent to the primary coolant water, or a primary coolant water filtering component, or so forth) with the pressure vessel such that (i) one of the inner passage and the outer annulus conveys primary coolant water from the pressure vessel to the primary coolant water processing component, and (ii) the other of the inner passage and the outer annulus conveys primary coolant water processed by the primary coolant water processing component from the primary coolant water processing component to the pressure vessel. The illustrative coaxial header 194 can be used for such applications, optionally with suitable modifications to direct or control (i) flow of primary coolant water into the coaxial pipe from the pressure vessel or a component therein and (ii) flow of processed primary coolant water from the coaxial pipe into the pressure vessel or a component therein (such as from the coaxial pipe 192 into the manifold plenum chamber 140 in the illustrative embodiment).

The manifold plenum chamber 140 is pressurized by the external hydraulic pumps 190 using a portion of the primary coolant water taken from the primary coolant water loop or circuit flowing in the pressure vessel 12. The internal turbo pumps 141 convert the excess head (that is, pressure) generated by the external hydraulic pump 190 into a larger volumetric flow suitable for providing active pumping of the primary coolant water in the reactor pressure vessel 12. (See FIG. 2 and related text). In this way, the external hydraulic pump 190, the manifold plenum chamber 140, and the turbo pumps 141 transforms pressure head into volumetric flow. This is analogous to an electrical circuit in which a transformer converts voltage to current. The manifold plenum chamber 140 is analogous to an electrical capacitor in that it accumulates and stores fluid pressure (analogous to an electrical capacitor storing voltage or charge) for use by the turbo pumps 141.

The electrical pumps 190 are referred to as external pumps because they are located outside of the pressure vessel 12. However, it is to be understood that some or even most of the components of the pump 190 may be within the pressure boundary of the pressure vessel 12. In some embodiments, only the impeller is within the pressure boundary of the pressure vessel 12, and that impeller connects with a "dry" rotor via a driveshaft passing through a graphalloy-based vessel penetration. In other embodiments, the impeller and a "wet" rotor may be inside the pressure boundary and in contact with primary coolant, and a "canned' structure separates the wet rotor from a dry stator. In yet other embodiments, the entire motor including both the stator and the rotor are "wet", and are disposed in a "canned" housing into which electrical power is delivered via suitable electrical vessel penetrations. In each case, the external pump 190 is located outside the pressure vessel 12 and hence is readily accessible during reactor shutdown in order to perform maintenance or replacement. Note that details of the electrical pumps 190 (e.g., rotor, stator, impeller components) are not shown in the drawings.

The conversion of hydraulic pump pressure head to volumetric flow enables a decoupling of the hydraulic pump head from the optimal head specifications for the reactor coolant system (RCS). For example, in some contemplated embodiments the external hydraulic pump 190 is expected to operate at a pump head of 170 psi which is typical of a boiler circulation pump. This is many times greater than the pressure drop of the reactor primary loop for a typical compact pressurized water reactor (PWR). The external hydraulic pump 190 can be operated at its best efficiency point (BEP) on the pump head curve as a function of volumetric flow rate. Likewise, the turbine 144 and impellor 142 of the turbo pump 141 can be designed for the optimal RCS pressure head and the turbo-pump portion of the total RCS flow. This decoupling of head specifications allows both pumps systems to be optimized for best efficiency.

In some embodiments, the flow rate delivered to the outlet 198 by the external pump 190 is approximately one-eighth (⅛) of the flow rate for the primary coolant flow circuit inside the pressure vessel 12. As a consequence, only a small portion (e.g., about 10%-15%) of the primary coolant flow in the pressure vessel 12 is drawn off by the electrical pump 190 in order to pressurize the manifold plenum chamber 140. Operation of the turbo pumps 141 by the pressurized primary coolant water in the manifold plenum chamber 140 provides active pumping of the primary coolant in the pressure vessel 12. The discharge from turbines 144 at the turbine outlets 156 contributes to the pumping, but the impellers 142 provide most of the flow.

In the illustrative example of FIGS. 13-23, twelve turbo-pumps 141 are spaced apart circumferentially inside the reactor downcomer annulus 22. In this example, there are six external hydraulic pumps 190 feeding the twelve turbo-pumps 141, providing a 2:1 ratio of two turbo pumps 141 per external hydraulic pump 190. This is the same ratio as in the example of FIGS. 3-9; however, the manifold plenum chamber 140 provides even distribution of the pressurized primary coolant water to the turbo pumps 141 which is robust against the failure of one or two or even a few more of the electrical pumps 190. For example, loss of one of the pumps 190 may reduce the overall pressure inside the manifold plenum chamber 140, but the manifold plenum chamber 140 will continue to distribute pressure to the turbo pumps 141 and so all twelve of the turbo pumps 141 are expected to continue to operate. Moreover, if the pumps 190 are not operated at their maximum output level, then loss of one (or even perhaps two or more) of these pumps 190 can be compensated by running the remaining pumps at higher output level. In contrast, in the embodiment of FIGS. 3-9 loss of a single one of the electrical pumps 46 results in loss of active pumping over a 90° arc of the downcomer annulus 22.

In the illustrative example of FIGS. 13-23, the circumferential manifold plenum chamber 140 is 4 mounted on the reactor upper shroud. Advantageously, the turbo pumps 141 are removable from the top individually, or the entire assembly (shroud and manifold plenum chamber 140) can be removed. (The entire assembly would usually only be removed for inspection of the reactor vessel at intervals longer than the refueling cycle). In the illustrative embodiment, the manifold plenum chamber 140 is sandwiched in between the gussets 200 of the reactor upper shroud. (Best seen in FIG. 13). In this way, the assembly can be inserted without damage to the manifold plenum chamber 140. The tapered ends of the gussets 200 guide the assembly into the reactor vessel. Other mounting structures and/or retaining elements can additionally or alternatively be employed in mounting the manifold plenum chamber 140 inside the pressure vessel 12, and specifically in the downcomer annulus 22 in this embodiment. Securing the manifold plenum chamber 140 inside the pressure vessel 12 using bolts or other removable fasteners advantageously enables the manifold plenum chamber 140 to be easily removed for maintenance; however, it is also contemplated for the manifold plenum chamber 140 to be welded into place. The turbo-pumps 141 are bolted to the manifold plenum chamber 140 at the respective openings 174 from the top (suction side) only, without any fasteners at the lower (discharge) side. In this way, a turbo pump 141 can be removed from above by disengaging the fasteners (e.g., bolts) and lifting the turbo pump 141 upward away from the manifold plenum chamber 140. The bolts or other fasteners secure a flange to the top (suction side) of the manifold plenum chamber 140 and, optionally along with a sealing gasket, provides a seal on the top (suction side) of the manifold plenum chamber 140 for the turbo-pumps 141. A compression seal ring 202 (best seen in FIG. 15) forms the seal on the bottom (discharge side) of the manifold plenum chamber 140. The coaxial inlet/outlet header 198 connects to the manifold box via a male/female fitting with O-ring seals, or by another suitable sealed connection configuration.

It is to be understood that the embodiment of FIGS. 13-23 is illustrative, and various components can be replaced by other components providing similar functionality.

Figure 30:
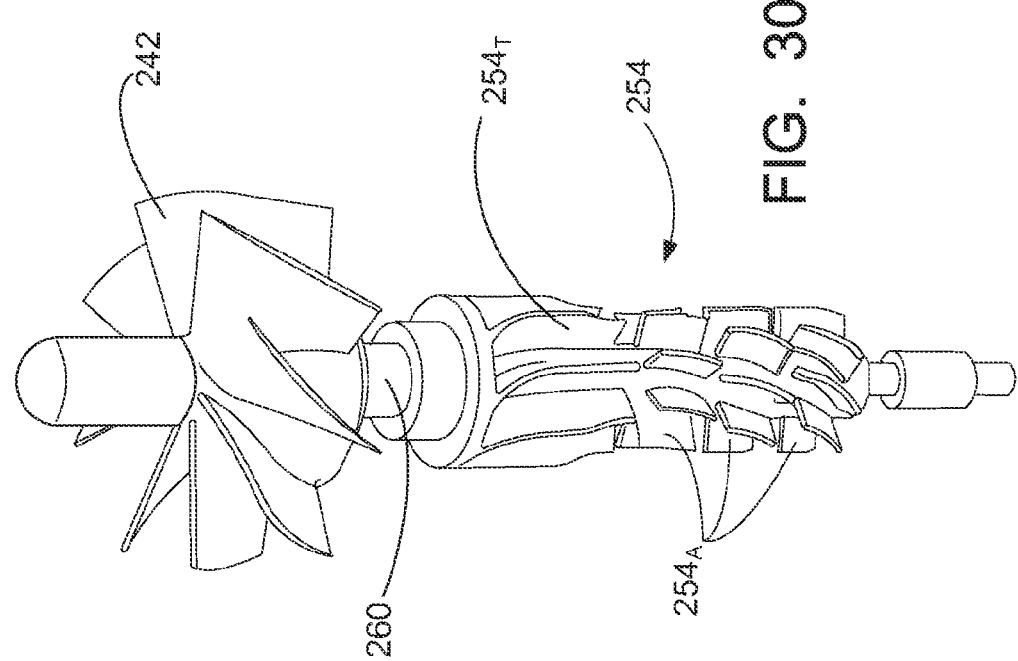
FIG. 30 shows a perspective view of the rotating impeller/turbine rotor assembly of one of the turbo pumps of the second manifold-based embodiment.
Figure 29:
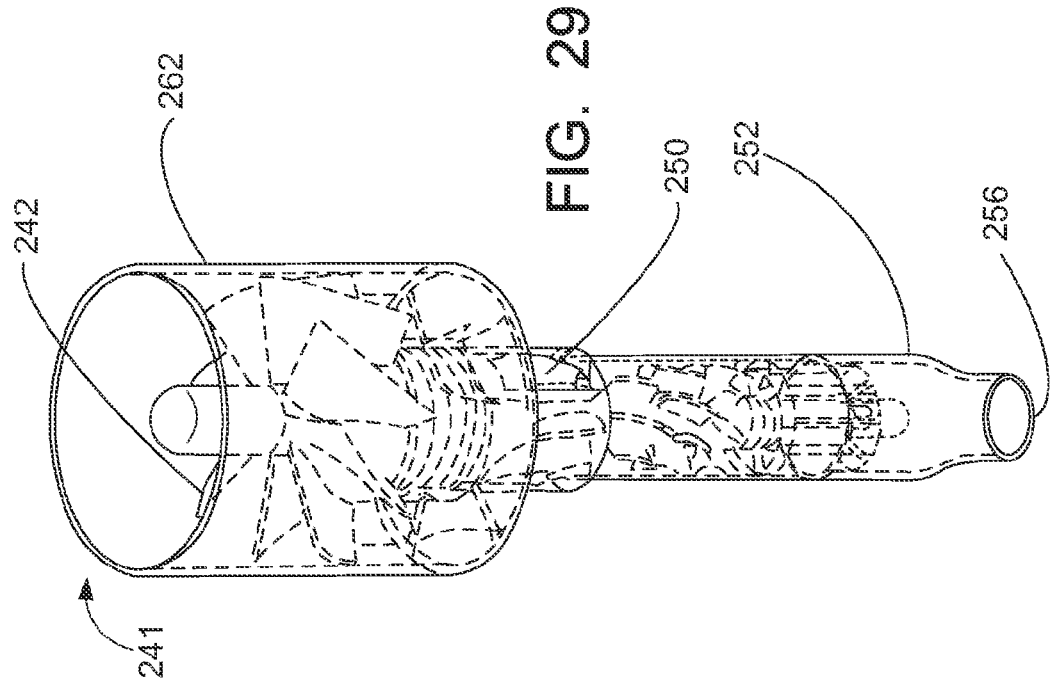
FIG. 29 shows a perspective view of one of the turbo pumps of the second manifold-based embodiment.

With reference to FIGS. 24-30, another illustrative embodiment employing the manifold plenum chamber 140 is described. Each illustrative turbo pump 241 includes an impeller 242 driven by a turbine 244 having a turbine inlet 250 passing into in a turbine housing or casing 252. In this embodiment the impeller 242 is located "above" the turbine 244. A turbine rotor 254 is disposed inside the turbine housing or casing 252, and working fluid (that is, pressurized primary coolant water flowing into the inlet 250 from the manifold plenum chamber 140) rotates the turbine rotor 254 as the working fluid transitions toward a generally downward flow that exits at a turbine outlet 256 at the "bottom" of the turbine housing or casing 252. As best seen in FIG. 30, the impeller 242 and a turbine rotor 254 are mounted on a common shaft 260 so as to rotate as a unitary rotating element. The impeller 242 is disposed in a tubular housing or duct 262, and primary coolant water pumped by the impeller 242 flows downward on the outside of the turbine 244. The discharge from the turbine outlet 256 also flows downward so as to add to the pumping of the impeller 242. Analogous to the embodiment of FIGS. 13-23, the turbo pumps 241 and the manifold plenum chamber 240 of the embodiment of FIGS. 24-30 form a reactor coolant pump (RCP) assembly having the suction side 158 above the RCP assembly and the discharge side 160 below the RCP assembly.

The impeller 242 has an axial flow design, and the turbine rotor 254 has tangential/axial turbine blades. Tangential flow from the inlet 250 impacts tangential blades $254_T$ then engages axial blades $254_A$ that turn the working fluid toward an axial flow that discharges at the turbine outlet 256. As best seen in FIG. 30, there are three banks of axial blades $254_A$ in the illustrative example. Each successive stage of axial blades $254_A$ has increasing blade angle so that the tangential component of the flow velocity is reduced to zero (or close to zero) at the turbine outlet 256.

The manifold plenum chamber 140 delivers pressurized primary coolant water to the turbine inlets 250 of the turbo pumps 241. With reference to FIGS. 27 and 28, the turbo pumps 241 are disposed in openings 274 of the manifold plenum chamber 140 (see FIG. 28) such that the manifold plenum chamber 140 encloses the inlets 250 of the turbines 244. In the illustrative embodiment, a flow distribution header 280 (best seen in FIG. 27) is sandwiched between the top and bottom plates of the manifold plenum chamber 140 (see FIG. 28) at each opening 174 in which a turbo pump 241 is installed. Each flow distribution header 280 includes a nozzle gate 282 aligned with the inlet 250 of the turbine 244 of the respective turbo pump 241 to inject primary coolant water from the manifold plenum chamber 140 into the turbine 244 in a tangential direction so as to engage with the tangential blades $254_T$. In the illustrative example, the flow distributor header 280 defines three sides of the nozzle gate 282 while the top of the manifold plenum chamber 140 defines the fourth side of the nozzle gate 282. The flow distributor 280 includes a bottom conical flange for the lower seal. The illustrative flow distributor 280 includes five openings through which the impellor 242 pumps primary coolant water through the RCP assembly.

With continuing reference to FIGS. 24-30, the manifold plenum chamber 140 can be pressurized using any suitable pumping configuration, such as using the external electrically driven hydraulic pumps 190 of the embodiment of FIGS. 13-23. Note that the pumps 190 are not shown in the embodiment of FIGS. 24-30; however, the embodiment of FIGS. 24-30 shows an alternative operative connection configuration for drawing primary coolant water from the pressure vessel 12 into the pump and pumping the pressurized primary coolant water into the manifold plenum chamber 140 to pressurize the chamber 140. As best seen in FIG. 28, the operative connection includes an upwardly curved inlet elbow pipe 192 disposed inside the pressure vessel 12 that collects and flows primary coolant water from the pressure vessel 12 through a vessel penetration and into an external inlet pipe 193 to supply primary coolant water to the external pump. The pressurized primary coolant water is delivered back into the pressure vessel (and more particularly into the manifold plenum chamber 140) through an external outlet pipe 194 and a vessel penetration immediately below that which passes the inlet flow. An external hydraulic pump nozzle header 195 (see FIG. 25) encloses the separate inlet/outlet lines so that external piping is not present, which reduces the likelihood of a LOCA at this penetration. The number of pumps (or, equivalently for this illustrative example, the number of external pump nozzle headers 195) can be as few as one (i.e., a single pump pressurizing the manifold plenum chamber 140) or can be two, three, four, or more. If the manifold plenum chamber 140 is divided into multiple isolated volumes by isolation plates, then each volume include at least one pump/header 195 to provide pressurization of that isolated volume. In general, two or more pumps/headers 195 per plenum volume ensures advantageous redundancy. In the illustrative example, there are 12 turbo pumps 141 and six external hydraulic pump nozzle headers 195, providing a 2:1 turbo pump/external pump ratio.

In the embodiment of FIGS. 24-30, the manifold plenum chamber 140 is mounted via the split gussets 200 (see FIG. 24) as in the embodiment of FIGS. 13-23. The turbo pumps 141 can again be mounted via fasteners from the suction side 158 only, with a lower compression seal ring to seal the discharge side 160.

In the embodiments of FIGS. 13-23 and 24-30, the RCP assembly including the manifold plenum chamber 140 and the turbo pumps 141 (FIGS. 13-23) or turbo pumps 241 (FIGS. 24-30) is disposed in the downcomer annulus 22. This arrangement has substantial advantages: this is the "cold" leg of the primary coolant flow loop or circuit so that the temperature is slightly lower; arrangement in the downcomer annulus frees up space inside the central riser 20 for other components such as internal control rod drive mechanisms (CDRM's), instrumentation, and so forth; and the downcomer annulus 22 is generally accessible during maintenance. However, it is also contemplated to dispose the RCP assembly elsewhere, such as inside the central riser 20 (analogous to the embodiment of FIG. 12, but including a manifold plenum chamber inside the central riser).

Figure 31:
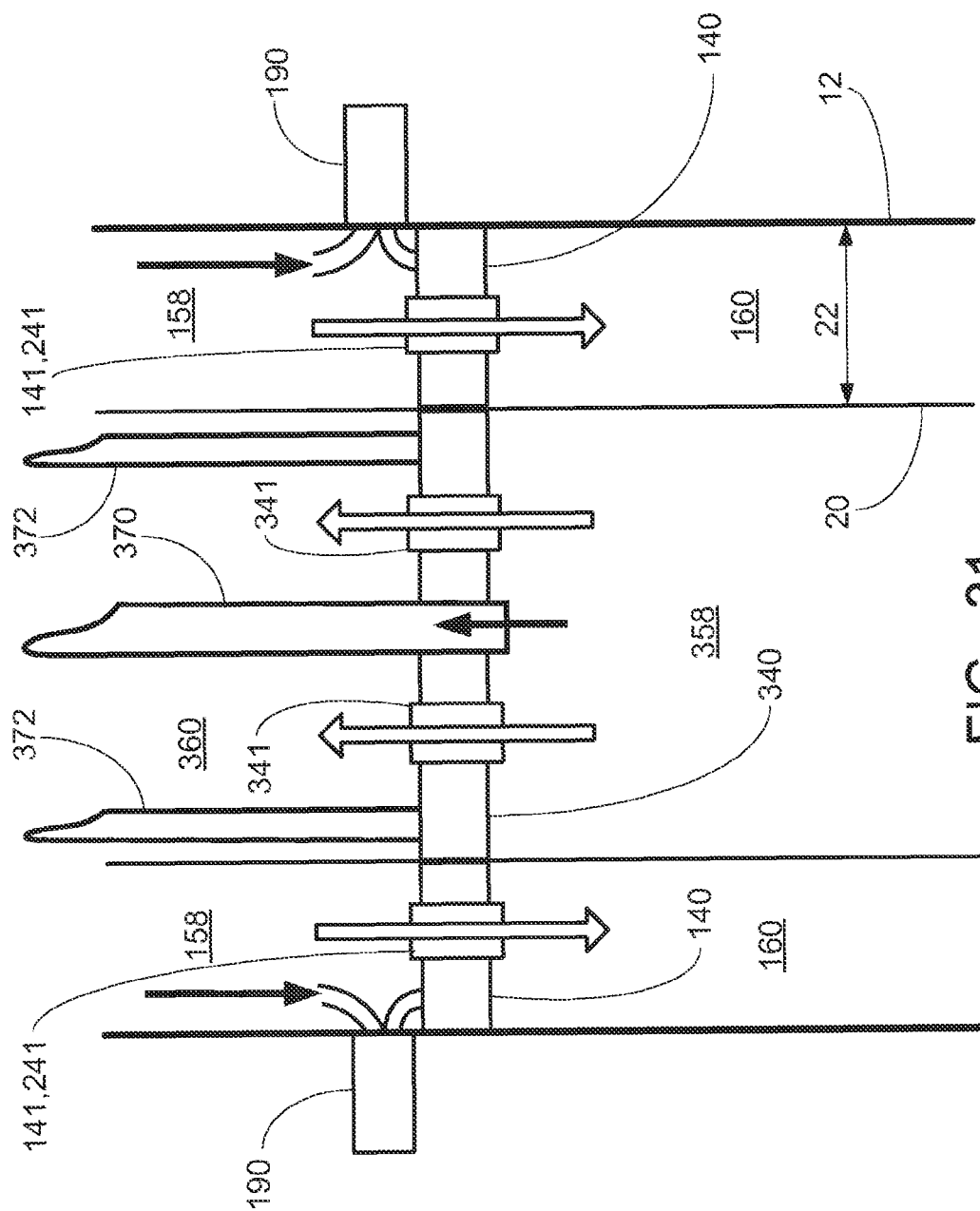
FIG. 31 diagrammatically shows a side view of a third manifold-based embodiment which includes a downcomer reactor coolant pump (RCP) assembly in the downcomer region and a riser RCP assembly inside the central riser.

With reference to FIG. 31, an embodiment includes two RCP assemblies. The first RCP assembly, i.e. a "downcomer" RCP assembly, is disposed in the downcomer annulus 22 and comprises the annular manifold plenum chamber 140 and turbo pumps 141 (FIGS. 13-23) or turbo pumps 241 (FIGS. 13-23). A second RCP assembly, i.e. a "riser" RCP assembly, is disposed inside the central riser 20, and comprises a riser manifold plenum chamber 340 and turbo pumps 341. As already described, the RCP assembly in the downcomer annulus 22 has its suction side 158 above the RCP assembly and its discharge side 160 below the RCP assembly, so that the RCP assembly generates or assists the downward flow of primary coolant water in the downcomer annulus 22.

In contrast, inside the cylindrical riser 20 the primary coolant flows upward, away from the nuclear reactor core. Accordingly, the RCP assembly disposed inside the central riser 20 has a suction side 358 disposed below the RCP assembly and a discharge side 360 disposed above the RCP assembly. In FIG. 31, large open arrows passing through the turbo pumps 141, 241, 341 show the pumped flow of primary coolant water produced by these pumps. The turbo pumps 341 can be variously embodied, for example as the turbo pumps 141 of the embodiment of FIGS. 13-23 or as the turbo pumps 241 of the embodiment of FIGS. 24-30. In either illustrative case, however, the turbo pumps 341 should be operatively "upside-down" as compared with the turbo pumps 141 or turbo pumps 241, so as to produce the desired orientation of the suction and discharge sides 358, 360. In some embodiments the fasteners for securing the turbo pumps 341 to the riser manifold plenum chamber 340 are at the discharge side 360 so that the turbo pumps 341 can be removed from above same as the turbo pumps 141, 241.

Differences in temperature and pressure between the volume inside the riser 20 and the downcomer annulus 22 tend toward constructing the downcomer manifold plenum chamber 140 and the riser manifold plenum chamber 340 as separate plenums in fluid isolation from each other. The primary coolant water for charging the riser manifold plenum chamber 340 is preferably drawn from inside the central riser 20, and more particularly from the suction side 358 of the riser RCP assembly (that is, from below the riser RCP assembly), for example by an illustrated inlet pipe 370. The drawn primary coolant water is pressurized by a suitable pump and the pressurized primary coolant water is injected into the riser manifold plenum chamber 340 via illustrative outlet pipes 372. Diagrammatic FIG. 31 shows only the ends of the piping 370, 372 terminating at or near the riser manifold plenum chamber 340; the distal connections to the pump (e.g., one of the pumps 390) is not shown.

As already mentioned, the riser manifold plenum chamber 340 and the downcomer manifold plenum chamber 140 should be in fluid isolation from each other. However, in some embodiments the riser manifold plenum chamber 340 and the downcomer manifold plenum chamber 140 are arranged in the same plane (e.g., at the same height, as shown in FIG. 31) and may optionally serve as a structural element for assisting in supporting the central riser 20 or other components.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

I claim:

1. An apparatus comprising:
   a nuclear core comprising a fissile material;
   a vertically oriented cylindrical pressure vessel containing the nuclear core immersed in primary coolant water;
   a cylindrical riser oriented coaxially inside the pressure vessel, the pressure vessel and the central riser defining a downcomer annulus;
   a plurality of turbo pumps disposed in the pressure vessel to provide active circulation of primary coolant water in the pressure vessel wherein each turbo pump includes a turbine operatively connected with an impeller to drive the impeller;
   a manifold plenum chamber including an annular housing, the manifold plenum chamber being disposed in the pressure vessel so that the annular housing surrounds the central riser and is in fluid communication with inlets of the turbines of the plurality of turbo pumps; and an electrically driven pump operatively connected with the manifold plenum chamber to pressurize the manifold plenum chamber with primary coolant water.

2. The apparatus of claim 1, wherein the electrically driven pump includes an inlet arranged to receive primary coolant water from the pressure vessel and an outlet operatively connected with the manifold plenum chamber to pressurize the manifold plenum chamber with primary coolant water.

3. The apparatus of claim 1, wherein the turbo pumps are disposed in openings passing through the manifold plenum chamber such that the turbo pumps and the manifold plenum chamber define a reactor coolant pump (RCP) assembly having a suction side and a discharge side separated from the suction side by the RCP assembly, the turbo pumps being arranged to pump primary coolant water from the suction side to the discharge side.

4. The apparatus of claim 3, wherein each turbo pump is secured in the respective opening of the manifold plenum chamber by fasteners at an installation side selected from the suction side and the discharge side such that the turbo pump can be removed from the manifold plenum chamber at the installation side by disengaging the fasteners and withdrawing the turbo pump from the manifold plenum chamber at the installation side.

5. The apparatus of claim 3, wherein each turbo pump is secured in its respective opening of the manifold plenum chamber by fasteners at one of the suction side and the discharge side and by a compression seal ring at the other of the suction side and the discharge side.

6. The apparatus of claim 3, further comprising:
flow distribution headers disposed in the manifold plenum chamber at respective openings in which the turbo pumps are installed, each flow distribution header including an area-reducing nozzle aligned with the inlet of the turbine of the respective turbo pump to inject primary coolant water from the manifold plenum chamber into the turbine.

7. The apparatus of claim 3, wherein the outlets of the turbines of the turbo pumps are arranged to discharge at the discharge side of the RCP assembly.

8. The apparatus of claim 3, wherein the inlets of the turbines of the turbo pumps are enclosed by the manifold plenum chamber.

9. The apparatus of claim 1, wherein the manifold plenum chamber is separate from and not welded to the pressure vessel.

10. The apparatus of claim 1, wherein the turbo pumps and the manifold plenum chamber define a reactor coolant pump (RCP) assembly having a suction side above the RCP assembly and a discharge side below the RCP assembly.

11. The apparatus of claim 10, wherein each turbo pump is secured in an opening of the manifold plenum chamber by fasteners on the suction side such that the turbo pump can be removed from the manifold plenum chamber by disengaging the fasteners and lifting the turbo pump upward away from the manifold plenum chamber.

12. The apparatus of claim 11, wherein each turbo pump is sealed at the discharge side by a compression seal ring but not by fasteners.

13. The apparatus of claim 10, wherein the turbines of the turbo pumps are configured to discharge into the downcomer annulus at the discharge side of the RCP assembly.

14. The apparatus of claim 1, wherein the nuclear core and the pressure vessel are configured as a pressurized water reactor (PWR) in which the primary coolant water in the pressure vessel does not boil.

15. The apparatus of claim 1, further comprising:
a coaxial pipe including an inner passage surrounded by an outer annulus, the coaxial pipe connecting the electrically driven pump with the pressure vessel,
wherein one of the inner passage and the outer annulus conveys primary coolant water from the pressure vessel to the electrically driven pump, and
wherein the other of the inner passage and the outer annulus conveys primary coolant water pressurized by the electrically driven pump from the electrically driven pump to the pressure vessel.

16. The apparatus of claim 15, wherein:
the inner passage conveys primary coolant water from the pressure vessel to the electrically driven pump, and
the outer annulus conveys primary coolant water pressurized by the electrically driven pump from the electrically driven pump to the pressure vessel.

17. An apparatus comprising:
a nuclear core comprising a fissile material;
a vertically oriented cylindrical pressure vessel containing the nuclear core immersed in primary coolant water;
a cylindrical riser oriented coaxially inside the pressure vessel so that a downcomer annulus is defined therebetween;
a plurality of turbo pumps disposed in the pressure vessel to provide active circulation of primary coolant water in the pressure vessel wherein each turbo pump includes a turbine operatively connected with an impeller to drive the impeller;
an annular manifold plenum chamber disposed in the downcomer annulus and in fluid communication with inlets of the turbines of the plurality of turbo pumps;
a riser manifold plenum chamber disposed inside the cylindrical riser; and
an electrically driven pump operatively connected with the manifold plenum chamber to pressurize the manifold plenum chamber with primary coolant water,
wherein the annular manifold plenum chamber and the turbo pumps in fluid communication with the annular manifold plenum chamber define a downcomer reactor coolant pump (RCP) assembly having a suction side in the downcomer annulus above the downcomer RCP assembly and a discharge side in the downcomer annulus below the downcomer RCP assembly, and
the riser manifold plenum chamber and the turbo pumps in fluid communication with the riser manifold plenum chamber define a riser reactor coolant pump (RCP) assembly having a suction side inside the riser below the riser RCP assembly and a discharge side inside the riser above the riser RCP assembly.

* * * * *